(12) United States Patent
Akagi et al.

(10) Patent No.: US 7,773,331 B2
(45) Date of Patent: Aug. 10, 2010

(54) THERMALLY ASSISTED MAGNETIC RECORDING SYSTEM

(75) Inventors: Fumiko Akagi, Fuchu (JP); Takuya Matsumoto, Hachioji (JP); Kimio Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 11/774,350

(22) Filed: Jul. 6, 2007

(65) Prior Publication Data

US 2008/0049357 A1 Feb. 28, 2008

(30) Foreign Application Priority Data

Aug. 28, 2006 (JP) ............................. 2006-230267

(51) Int. Cl.
*G11B 5/02* (2006.01)
(52) U.S. Cl. ........................... 360/59; 360/62; 360/110; 360/125.31
(58) Field of Classification Search ................... 360/59, 360/62, 110, 313
See application file for complete search history.

(56) References Cited

U.S. PATENT DOCUMENTS

| | | | | |
|---|---|---|---|---|
| 5,652,054 | A * | 7/1997 | Kikitsu et al. ................ | 428/328 |
| 6,602,620 | B1 * | 8/2003 | Kikitsu et al. ............ | 428/842.2 |
| 6,649,894 | B2 | 11/2003 | Matsumoto et al. | |
| 6,714,370 | B2 * | 3/2004 | McDaniel et al. ............. | 360/59 |
| 6,773,788 | B2 * | 8/2004 | Mori et al. ............... | 428/842.8 |
| 6,804,175 | B2 * | 10/2004 | Ruigrok et al. .......... | 369/13.55 |
| 6,977,108 | B2 * | 12/2005 | Hieda et al. ................ | 428/64.2 |
| 7,038,873 | B2 * | 5/2006 | Shimazaki et al. ............ | 360/59 |
| 7,068,453 | B2 * | 6/2006 | Terris et al. ................... | 360/59 |
| 7,133,230 | B2 * | 11/2006 | Saga et al. .................... | 360/59 |
| 7,142,391 | B2 * | 11/2006 | Ohtomo et al. ........ | 360/125.51 |

(Continued)

FOREIGN PATENT DOCUMENTS

JP 2003-045004 2/2003

(Continued)

OTHER PUBLICATIONS

Hideki Saga, et al.; New Recording Method Combining Thermo-Magnetic Writing and Flux Detection; Japanese Journal of Applied Physics; Mar. 1999; pp. 1839-1840; vol. 38, Part 1, No. 3B.

(Continued)

*Primary Examiner*—Dismery E Mercedes
(74) *Attorney, Agent, or Firm*—Antonelli, Terry, Stout & Kraus, LLP.

(57) ABSTRACT

The optimum head-field intensity for saturation recording is assumed to be $560 \times 10^3$ A/m or more. Under a condition where the recording track width of an information recording medium is equal to or less than 60 nm, the optimum head-field intensity Y satisfies the following inequalities (1) and (2):

$$Y \geq (X^2 - 119 \times X + 4135) \times 1000 \qquad (1)$$

$$Y \leq (X^2 - 119 \times X + \text{const}) \times 1000 \qquad (2)$$

where X denotes the nondimensional value of the recording track width divided by $10^{-9}$ m, and Y denotes a magnetic field (expressed in units of A/m) which a magnetic pole for head-field application applies to the center of the information recording medium in the direction of the thickness thereof. Note that $\text{const} = -0.8 \times v^2 + 33.7 \times v + 4250$ if the relative velocity v between the head and the medium at the position of the head is less than 20 m/sec, or $\text{const} = 4600$ if the velocity v is equal to or more than 20 m/sec.

13 Claims, 15 Drawing Sheets

U.S. PATENT DOCUMENTS

| | | | |
|---|---|---|---|
| 7,153,597 B2 * | 12/2006 | Yang et al. | 428/836 |
| 2002/0191320 A1 * | 12/2002 | Coffey et al. | 360/59 |
| 2005/0071859 A1 * | 3/2005 | Coehoorn et al. | 720/659 |
| 2005/0142388 A1 * | 6/2005 | Hirayama et al. | 428/694 TM |
| 2005/0259343 A1 * | 11/2005 | Akagi et al. | 360/59 |
| 2006/0068231 A1 * | 3/2006 | Hattori | 428/836.2 |
| 2006/0114591 A1 | 6/2006 | Taguchi et al. | |
| 2006/0199043 A1 * | 9/2006 | Sugimoto et al. | 428/828.1 |
| 2006/0221483 A1 * | 10/2006 | Kamimura et al. | 360/59 |
| 2006/0228589 A1 * | 10/2006 | Choi et al. | 428/836.3 |
| 2007/0041119 A1 | 2/2007 | Matsumoto et al. | |
| 2008/0068748 A1 * | 3/2008 | Olson et al. | 360/110 |

FOREIGN PATENT DOCUMENTS

| | | |
|---|---|---|
| JP | 2006-155746 | 6/2006 |

OTHER PUBLICATIONS

J.U. Thiele, et al.; Temperature dependent magnetic properties of highly chemically ordered Fe55-XniXpt45L10 films; Journal of Applied Physics; May 15, 2002; pp. 6595-6600; vol. 91, No. 10.

Atsushi Nakamura, et al.; M-H Loop Slope and Recording Properties of Perpendicular Media; Sep. 9, 2004; pp. 6052-6055; vol. 43, No. 9A.

Norio Ota, Hybrid Recording Capability Toward Tera bit/in2 Density; Manuscript (pp. 39-50) submitted for the $128^{th}$ symposium (2003) held by the Magnetic Society of Japan.

Terry W McDaniel; Ultimate limits to thermally assisted magnetic recording; Journal of Physics; Feb. 4, 2005; pp. R315-R332.

James A. Bain; Side Track Erasure and Wide Magnetic Pole Hamr Write Heads; Moris 2006 Workshop,Technical digest. TuA-02; pp. 4-5.

* cited by examiner 30 nm WRITE TRACK WIDTH $H_k = 720 \times 10^3$ A/m, $H_h = 720 \times 10^3$ A/m $H_k = 80 \times 10^3$ A/m, $H_h = 80 \times 10^3$ A/m RECORDING TRACK WIDTH = 30 nm RECORDING TRACK WIDTH = 60 nm RECORDING TRACK WIDTH = 30 nm RECORDING TRACK WIDTH = 60 nm $v = 5$ m/sec $v = 10$ m/sec v = 5 m/sec v = 60 m/sec

THERMALLY ASSISTED MAGNETIC RECORDING SYSTEM

CLAIM OF PRIORITY

The present application claims priority from Japanese application JP2006-230267 filed on Aug. 28, 2006, the content of which is hereby incorporated by reference into this application.

BACKGROUND OF THE INVENTION

1. Field of the Invention

The present invention relates to an information recording system having a high recording density, and more particularly to a thermally assisted magnetic recording system including a probe of near-field light that irradiates a recording medium with light, and a magnetic read-write head.

2. Description of the Related Art

A magnetic disc system mounted on a computer or the like as one of information storage systems that support present-day information society is rapidly becoming higher in recording density, higher in speed, and smaller in size. In order for the magnetic disc system to achieve a high recording density, it is necessary to reduce a distance between a magnetic disc and a magnetic head, to make fine a crystal grain size that forms a magnetic layer of a magnetic recording medium, to increase the coercivity (or magnetic anisotropy field) of the magnetic recording medium, to speed up a signal processing method, and to do the like.

In the case of the magnetic recording medium, making the crystal grain size fine leads to a reduction in noise but causes the problem of rendering grains thermally unstable. $K_u V/kT$ is an index of thermal stability, where $K_u$ denotes a magnetic anisotropy constant; V, the volume of the grains; k, a Boltzmann constant; and T, a temperature. The larger value of $K_u V/kT$ indicates higher thermal stability. The magnetic anisotropy constant must be increased in order to ensure the thermal stability, while making the crystal grain size fine. However, an increase in the magnetic anisotropy constant, that is, an increase in the magnetic anisotropy field (or the coercivity), means an increase in head-field intensity required for recording. It is considered to be difficult, from now, to increase the magnetic anisotropy field with increasing recording density, because of restrictions on the use of a material for a magnetic pole for a write head and restrictions on the reduction of the distance between the magnetic disc and the magnetic head.

Hybrid recording technique having a combination of optical recording technique and magnetic recording technique is proposed in order to solve the foregoing problems. Attention is being given to the hybrid recording technique. A read-write head described in Jpn. J. Appl. Phys. Vol. 38 (1999), pp. 1839-1840, for example, is provided with the addition of a mechanism that irradiates light in an area where a recording magnetic field is applied. During recording, the magnetic field is applied and the light is irradiated simultaneously. Thereby, the recording is performed by utilizing the effect of reducing the magnetic anisotropy field (or the coercivity) of the medium by heating via the light irradiation. In other words, the medium is heated via the light irradiation to thereby reduce the magnetic anisotropy field of the medium having a high magnetic anisotropy field at room temperature for achieving an ultrahigh recording density, on which a conventional magnetic head has difficulty in recording because of an insufficient recording magnetic field. Thereby, the read-write head facilitates recording. This recording method is called a "thermally assisted magnetic recording method."

A thermally assisted magnetic recording system is basically considered as an extension of a conventional perpendicular recording system. A magnetic write head uses a single pole type head, and a read head uses an MR (magnetoresistive) head for use in conventional magnetic recording. However, the examination of the optimum configuration of the magnetic head and the examination of technique for achieving a merger between the magnetic head and the heating mechanism are important subjects for thermally assisted magnetic recording. A heat generating device has to rapidly heat and cool a tiny heating region to achieve a high recording density for the magnetic disc system. Accordingly, there is a limit to the approach of focusing laser light through a lens generally used for optical recording. The approach of generating near-field light by a metallic surface plasmon is proposed as an approach for solving this, and studies are carried out. See Japanese Patent Application Laid-open Publication No. 2003-45004, etc.

Recording methods close to the thermally assisted magnetic recording method include an optical magnetic recording method. In the optical magnetic recording method, a change in magnetic properties based on a temperature increase in the medium by laser light irradiation is utilized for magnetic recording. The recording methods are of some types. One of the types is the recording method that involves heating, to Curie temperature, a medium using TbFe (a terbium-iron alloy), GdTbFe (a gadolinium-terbium-iron alloy), or the like. Specifically, spontaneous magnetization decreases sharply in the vicinity of the Curie temperature, and paramagnetism develops at or above the Curie point. At this time, a magnetic field is applied in an opposite direction. In a cooling process, magnetization rotation occurs, so that a mark is recorded. Another type is the recording method that involves heating a medium made of GdFeO (a gadolinium-iron-oxygen alloy) or GdCo (a gadolinium-cobalt alloy) at or above a compensation point. This method utilizes a phenomenon given below. When two sublattice magnetizations of ferrimagnetism compensate each other at a temperature on which these magnetizations are dependent, macroscopic magnetization becomes zero (which is called a "compensation point"), so that coercivity is maximized. When such a material as has a compensation point at room temperature is heated at or above the compensation point, therefore, the coercivity is reduced, so that magnetization is oriented in the direction of an external magnetic field. The medium is made of an amorphous alloy film of rare earth and transition metal. A record mark is determined by forming a cylindrical magnetic domain. Formation of the magnetic domain is determined by a balance between some forms of magnetic energy (such as external magnetization energy and magnetic domain wall energy) acting on the medium. Because of having no grain boundary, the amorphous alloy film has the merit of achieving a low noise level as compared to a CoCr-base granular medium that has been heretofore used for the magnetic disc. For the formation of the magnetic domain, however, it is difficult to control the magnetic energy. It is particularly difficult to control magnetic domain wall motion by the action of the magnetic domain wall energy or to control the thickness of the magnetic domain wall. As the recording density becomes higher, the record mark may possibly become larger than the spot size of light or become rather smaller and disappear. Consequently, the amorphous alloy film is considered to be unsuitable for high recording densities.

The CoCr-base medium in current use as a perpendicular recording medium is the medium formed of fine crystal grains. Each individual grain is surrounded by an $SiO_2$ (silicon oxide) layer that is a non-magnetic layer. The CoCr-base medium is known as the medium in which a considerably weak magnetic exchange interaction takes place between the grains. The medium in which each individual grain is surrounded by the non-magnetic layer as mentioned above is generally called a "granular medium." In the granular medium, the magnetizations of the individual grains rotate independently, because a considerably weak magnetic exchange interaction occurs between the grains. The granular medium as applied to the thermally assisted magnetic recording method can achieve a desired uniform record mark, because of easily controlling the size of the record mark (or record bit) by using the magnitude of the magnetic field, the spot size of heat, the magnetic properties, or the like. In other words, the granular medium has a structure suitable for high recording densities and is very likely to be a medium for thermally assisted magnetic recording.

The thermally assisted magnetic recording is characterized by facilitating recording because the magnetic anisotropy field intensity (or the coercivity) of the medium is reduced by heating the medium, as mentioned above. In other words, the magnetic anisotropy field intensity of the medium has dependence on temperature, and therefore the magnetic anisotropy field intensity becomes lower as the temperature of the medium becomes higher. See J. Appl. Phs. 91, (2002) pp. 6595-6600. The head-field intensity required to perform saturation recording on the medium is known to be equal to or more than the magnetic anisotropy field intensity of the medium at the center of a magnetic recording layer in the direction of the thickness thereof. See Jpn. J. Appl. Phys. Vol. 43 (2004) pp. 6052-6055. In other words, when the head-field having the same intensity as the magnetic anisotropy field intensity is applied to the medium, magnetization rotates completely, so that recorded magnetization is saturated. For example, when a head-field intensity of $1000 \times 10^3$ A/m is applied to the medium having a magnetic anisotropy field of $1000 \times 10^3$ A/m, saturation recording can be performed. It is therefore possible that if light irradiation of the medium enables a reduction in the magnetic anisotropy field, the head-field intensity required for saturation recording can be proportionally reduced. For example, it can be easily expected that if the magnetic anisotropy field can be reduced to $200 \times 10^3$ A/m, a head-field intensity of $200 \times 10^3$ A/m is sufficient. Actually, the optical magnetic recording method close to the thermally assisted magnetic recording method achieves recording at a magnetic field intensity of $80 \times 10^3$ A/m or less by heating, to the vicinity of the Curie point, a medium having a magnetic anisotropy field of about $1600 \times 10^3$ A/m at room temperature. For this reason, even the thermally assisted magnetic recording method is expected to enable recording with a low magnetic field. See The Magnetics Society of Japan, Bulletin of topical symposium, No. 128 (2003) pp. 39-50. Furthermore, the results of computer simulation of thermally assisted magnetic recording are given in J. Phys.: Condens. Matter 17 (2005) R315-332. Specifically, the simulation involves irradiating a medium having a magnetic anisotropy field $H_k$ of $860 \times 10^3$ A/m with light having a spot size of $150 \times 200$ nm, and applying a magnetic field at a low head-field intensity of $240 \times 10^3$ A/m, thereby performing recording at a recording density of about 100 Gbpsi. This simulation shows that a much lower magnetic field than $H_k$ can be used for recording at an assumed recording density for thermally assisted magnetic recording, although the spot size is very large and both the recording density and $H_k$ are excessively low.

The relation between head-field intensity and sidetrack erase for thermally assisted magnetic recording has been reported in MORIS 2006 WORKSHOP, Technical digest, TuA-02. An analysis method is an analysis of static behavior, not allowing for the speed of magnetization rotation. The relation between magnetic field intensity and magnetization rotation has been determined under the following conditions: the ratio between static magnetic energy ($2\mu_0 HM_s V$, where $\mu_0$ denotes the permeability of vacuum; H, an applied magnetic field; $M_s$, a saturation magnetic flux density; and V, the volume of grains) required for magnetization to rotate in the direction of desired head-field intensity in the vicinity of the Curie point and thermal fluctuation energy kT (where k denotes a Boltzmann constant; and T, an absolute temperature) exceeds 4, and the ratio between energy that rotates magnetization and thermally stabilizes recording magnetization (namely, magnetic anisotropy energy: $K_u V \times (1-H/H_k)$, where $K_u$ denotes a magnetic anisotropy constant) and thermal fluctuation energy kT exceeds 3. This report has shown that a magnetic field intensity of $480 \times 10^3$ A/m or more is necessary in order that magnetization undergoes 95% or more rotation.

SUMMARY OF THE INVENTION

However, a different result is obtained by a calculation method using a micromagnetics approach that is an analysis of dynamic behavior allowing for the speed of magnetization rotation. For example, assuming that a medium having a magnetic anisotropy constant of $8 \times 10^5$ J/m$^3$, V of 305 nm$^3$, $H_k$ of $3200 \times 10^3$ A/m, and a Curie point of 650 K is recorded with a track width of 30 nm at a relative velocity of 60 m/s. A temperature at which magnetization rotates, and at which recording magnetization is thermally stabilized is about 450 K. The magnetic anisotropy field intensity is about $2400 \times 10^3$ A/m. Ku is $6 \times 10^5$ J/m$^3$. The magnetic field intensity required for saturation recording is about $2000 \times 10^3$ A/m. When the ratio between the magnetic anisotropy energy and the thermal fluctuation energy kT, during recording, is calculated from the above result, the ratio is equal to or less than 1, which is different from the condition of the static analysis (that is, the condition that the ratio exceeds 3) reported in MORIS 2006 WORKSHOP, Technical digest, TuA-02. From this fact, it is possible that the static analysis cannot precisely determine the magnetic field intensity required for saturation recording.

By using the micromagnetics approach that is the dynamic behavior analysis, examinations have been therefore made on the magnetic field intensity required for saturation recording, targeted for high recording densities (400 Gbpsi or more) in the future. For example, thermally assisted magnetic recording was performed by reducing the magnetic anisotropy field to nearly zero by sufficiently heating a medium with a magnetic anisotropy field of $3200 \times 10^3$ A/m at room temperature to a temperature in the vicinity of the Curie point (650 K). Thermal distribution was assumed as Gaussian distribution, and the half value width of the thermal distribution was set to 50 nm. The recording density was set to 1000 kfci. FIG. 4 shows the dependence of the ratio SNR of output signal to noise (SNR=20×log(output signal/noise), the output signal lies between 0 and a peak value) on magnetic field intensity. FIG. 5 schematically illustrates how a recording magnetization profile appears and the magnetization rotation of grains of the medium, as viewed from the head side, at the minimum value ($720 \times 10^3$ A/m) of the head-field intensity that is obtained when SNR is substantially constant. In a schematic illustration of the magnetization rotation of the grains of the medium, white circles represent the grains magnetized in a perpendicular plus direction of the medium, and black circles represent the grains magnetized in a perpendicular minus direction of the medium. The outside of the recording track is shown by the black circles, provided that the grains of the medium are magnetized in the perpendicular minus direction when the medium is in its initial state. The value of the recording magnetization profile is determined by calculating the average of recording remanent magnetization values in the track width direction, provided that a read track width is 30 nm (a recording track width is 50 μm). The vertical axis indicates the value of recording remanent magnetization normalized by saturation magnetization, and the horizontal axis indicates a down-track position. As shown in FIG. 5, the recording remanent magnetization substantially reaches saturation magnetization $M_s$. On the other hand, it has been shown that when the head-field intensity is equal to or less than $720 \times 10^3$ A/m, the medium doesn't saturate. In other words, if the minimum value of the head-field intensity capable of saturation recording is called "optimum head-field intensity," it has been shown that under this calculation condition the optimum head-field intensity is $720 \times 10^3$ A/m. From this result, it has been shown that even if the magnetic anisotropy field intensity is reduced to zero by heating, the granular medium requires a head-field intensity of $720 \times 10^3$ A/m and cannot achieve saturation recording at a low magnetic field intensity of 1000 A/m or less, as given by the optical magnetic recording method or J. Phys.: Condens. Matter 17 (2005) R315-332.

From the above, the examination of the optimum head-field intensity required for saturation recording by the thermally assisted magnetic recording system using the granular medium is an important subject. The reason for this is as follows. Saturation recording is impossible with low magnetic field intensity required for recording on the amorphous alloy film such as is used in the optical magnetic recording method. Furthermore, the optimum head-field intensity for achieving high recording densities has not been reported, although it has been reported that the optimum head-field intensity is considerably low when the spot size is very large and both the recording density and $H_k$ are low. Although there is also a report that the application of a magnetic field of $480 \times 10^3$ A/m or more can possibly yield 95% or more magnetization rotation, this is the result of analysis based on a static approach not allowing for the speed of magnetization rotation. The result of static analysis not considering the relative velocity isn't different from actual behavior, because actually the head and the medium relatively move. From the above, a dynamic behavior analysis must be used to determine the optimum head-field intensity required for saturation recording by thermally assisted magnetic recording system for achieving the high-recording-density using the granular medium.

In the thermally assisted magnetic recording system using the granular medium, the magnetic field intensity applied both to the center of the medium in the direction of the thickness thereof and to recording track edges (i.e., the edges of the recording track width in its width direction) is set to $560 \times 10^3$ A/m or more. The magnetic field intensity may be uniform in the vicinity of a recording region. Under a condition where the recording track width of the information recording medium is equal to or less than 60 nm, the optimum head-field intensity Y satisfies the following inequality:

$$Y \leq (X^2 - 119 \times X + 4135) \times 1000 \qquad (1)$$

where X denotes the nondimensional value of the recording track width divided by $10^{-9}$ m, and Y denotes the magnetic field (expressed in units of A/m) applied by the magnetic pole for head-field application to the center of the information recording medium in the direction of the thickness thereof.

Further, the optimum head-field intensity Y satisfies the following inequality (2) in conjunction with Inequality (1):

$$Y \leq (X^2 - 119 \times X + \text{const}) \times 1000 \qquad (2)$$

provided that $\text{const} = -0.8 \times v^2 + 33.7 \times v + 4250$ if v is less than 20 m/sec, or $\text{const} = 4600$ if v is equal to or more than 20 m/sec, where v denotes a relative velocity between the head and the medium at the position of the head.

According to the present invention, the thermally assisted magnetic recording system that records magnetization information on a granular magnetic recording medium by a head-field, while performing light irradiation, is capable of saturation recording and achieving a high ratio of output signal to noise.

DETAILED DESCRIPTION OF THE INVENTION

Description will be hereinafter given with regard to an embodiment of the present invention with reference to the accompanying drawings.

Figure 2:
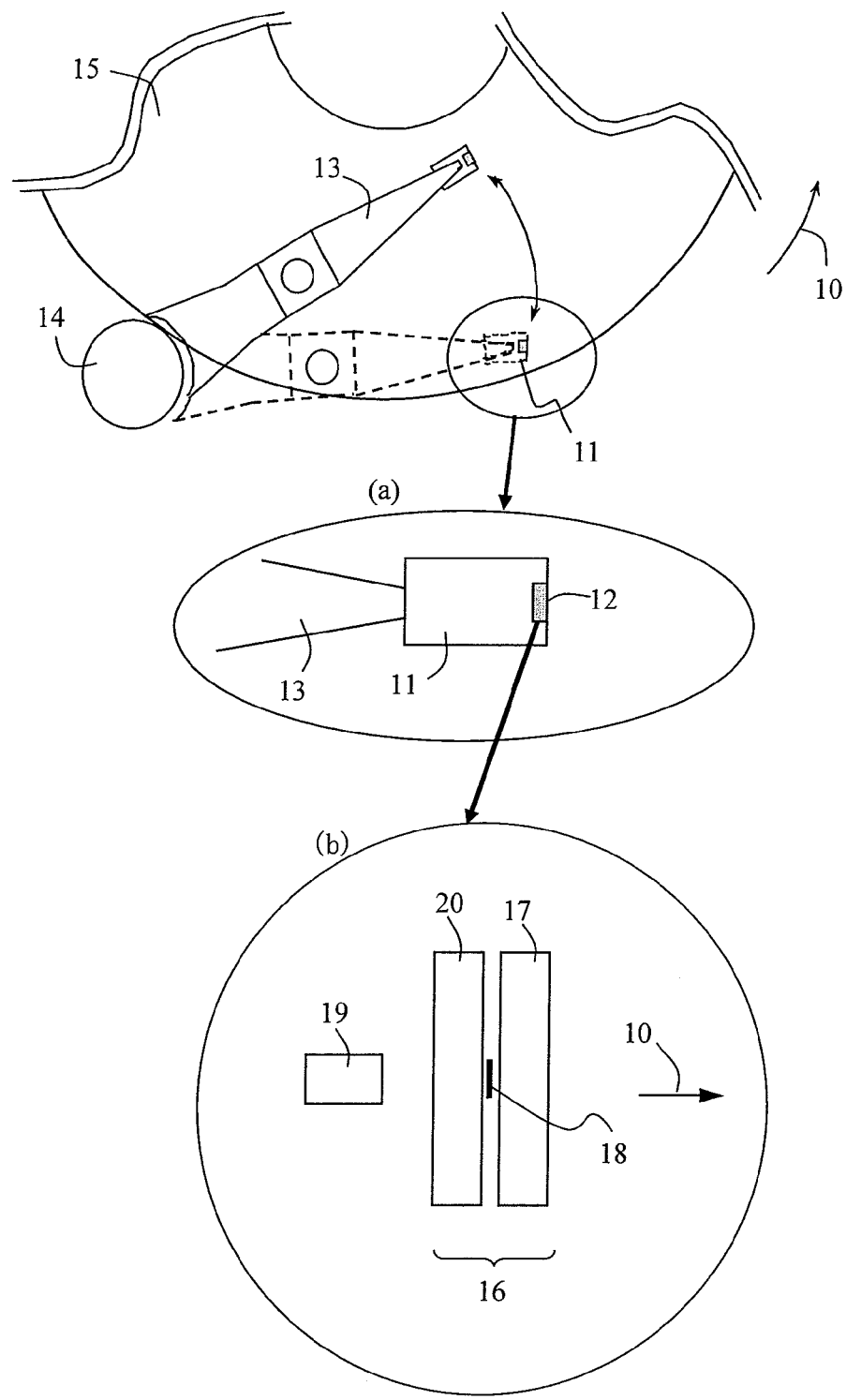
FIG. 2 is a schematic illustration showing the structure of a thermally assisted magnetic recording system according to the present invention.

FIG. 2 is a schematic illustration showing the structure of a magnetic recording system according to the present invention. One or more magnetic discs 15 are generally loaded in a drive unit of the magnetic recording system. The magnetic disc 15 is rotatably driven in the direction of an arrow 10 of FIG. 2. A magnetic head 12 is disposed at the rear end of a magnetic head slider 11 fixed at the distal end of a carriage 13, as illustrated in enlarged view in FIG. 2. See part (a) of FIG. 2. The magnetic head 12, when driven by a voice coil motor 14, accesses a desired track to perform either of the reading and writing of data from and to the magnetic disc (or medium) 15. In FIG. 2, there is schematically illustrated, in enlarged view, the configuration of the magnetic head 12 formed of a write head 19 for writing and a read head 16 for reading, as viewed from the medium-facing surface side. See part (b) of FIG. 2. The write head 19 is a single pole type write head for perpendicular recording. A magnetic field leaking out from the single pole type write head 19 is applied on the medium and the medium is magnetically recorded. The read head 16 includes a read sensor 18 made of a magnetoresistive (MR) element interposed in between a bottom magnetic shield 17 and an upper magnetic shield 20. An output signal is produced by flowing a leakage flux from the medium 15 into the read sensor 18.

Figure 3:
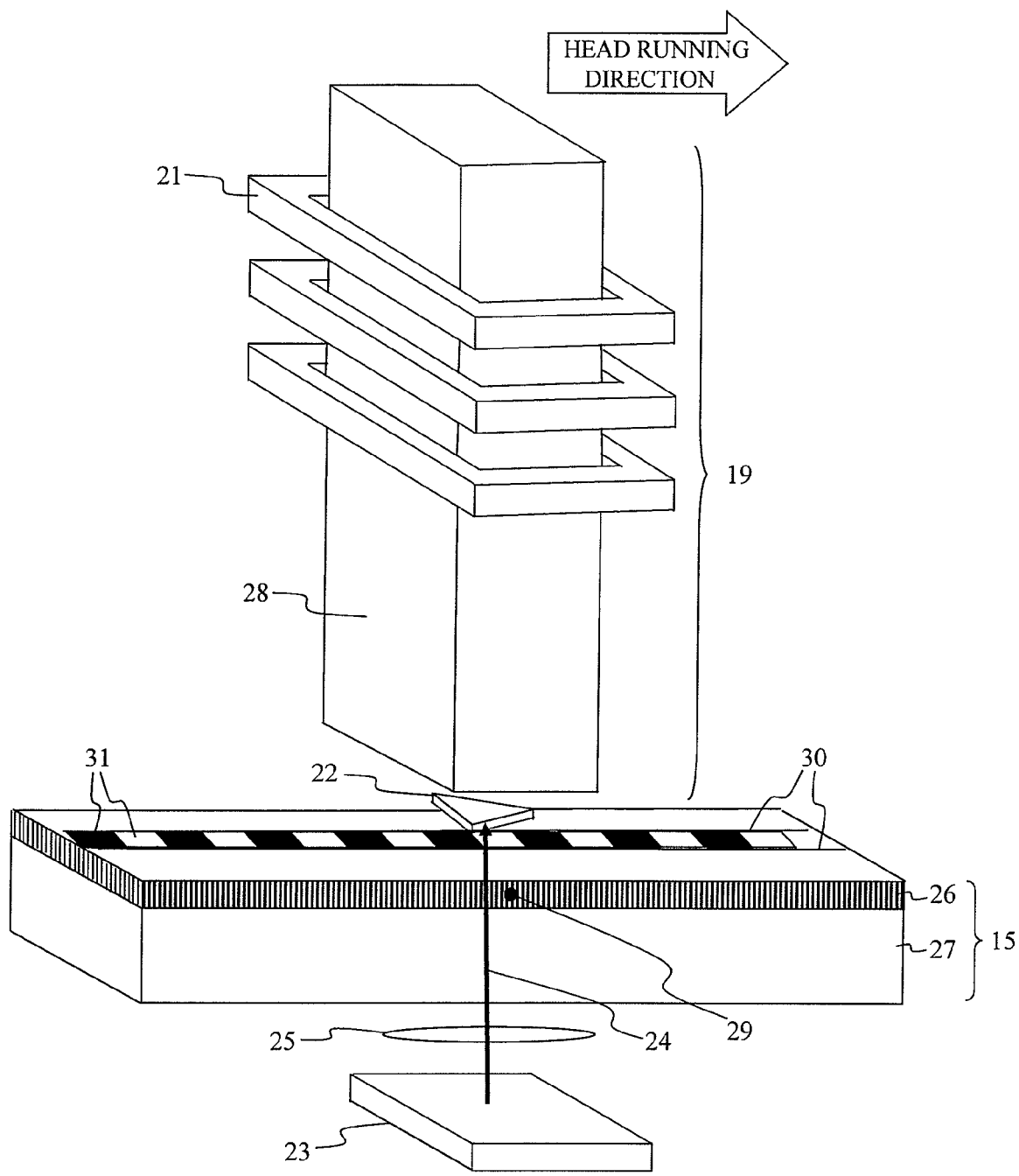
FIG. 3 is a cross-sectional view showing an example of the configuration of a write head and a medium according to the present invention.

FIG. 3 is a cross-sectional view showing an example of the configuration of the write head and the medium according to the present invention. The medium 15 includes a crystallographic glass substrate 27, and a magnetic recording layer 26 formed on top of the glass substrate 27. Desirably, an underlayer (not shown) or the like for controlling the orientation of the magnetic recording layer is disposed between the glass substrate and the magnetic recording layer. A soft-magnetic layer may be also disposed between the crystallographic glass substrate and the magnetic recording layer. Whether or not the soft-magnetic layer is necessary is determined by the relation between magnetic field intensity required for saturation recording and head-field intensity in the absence of the soft-magnetic layer. The magnetic recording layer 26 is a granular magnetic thin film with perpendicular magnetization, having an axis of easy magnetization perpendicularly to its film surface. The granular magnetic thin film with perpendicular magnetization has a structure in which fine magnetic grains separate in a non-magnetic matrix such as oxide, and the magnetic grains are substantially magnetically isolated from one another with a non-magnetic material in between. Each individual grain has a grain size of 10 nm or less, which is a minimum unit of magnetization. For example, the magnetic grains of CoCrPt (a cobalt-chromium-platinum alloy), CoPt (a cobalt-platinum alloy), or the like can be dispersedly precipitated in the non-magnetic matrix made of $SiO_2$ (silicon oxide). An alloy having high magnetic anisotropy energy, such as CoPt or SmCo (a samarium-cobalt alloy), may be used for the magnetic grains. A superlattice multilayer film containing Co and Pd (palladium) (Co/Pd) or the like, FePt (an iron-platinum alloy) proposed for thermally assisted magnetic recording, or the like may be also used. Besides the above, oxide such as alumina may be used for the non-magnetic matrix.

The write head 19 is configured of a single pole 28 made of a soft-magnetic material such as Permalloy or CoNiFe (a cobalt-nickel-iron alloy), and a coil (or a conductive pattern) 21 formed in a helical fashion, as shown for example in FIG. 3. Both terminal ends of the coil are led out to a magnetic head drive circuit. The supply of a drive current leads to the passage of the current through the coil, thereby to the magnetization of the single pole 28, and thereby to the application of a recording magnetic field to the magnetic recording layer 26 in the vicinity of the distal end of the single pole 28. The single pole is of a size of the order of, for example, a few hundreds of nanometers (nm) to 1 μm. This is a designed value such that desired head-field intensity is achieved both at a center 29 of the magnetic recording layer in the direction of the thickness thereof and at recording track edges 30. Allowance should be made for the head-field intensity at the recording track edges, because whether or not magnetization rotation occurs at the recording track edges is important for a desired recording track width. The write head may be also provided with an auxiliary pole in order to achieve desired magnetic field intensity. There is also provided an optical dispersion 22 for light irradiation, which is disposed in the vicinity of the write head 19 (or may be disposed toward the trailing or leading edge of the write head or be disposed immediately underneath the write head). Shown in FIG. 3 is an instance where the optical dispersion is disposed immediately underneath the write head. There are also provided a plane laser 23 and a hologram lens 25, which serve to irradiate the optical dispersion 22 with laser light 24. The laser light can be emitted to the write head from the medium-facing surface side or from the magnetic head side. Shown in FIG. 3 is an instance where the laser light is emitted to the write head from the medium-facing surface side. To record information on the medium 15, the laser light 24 is emitted from the plane laser 23 that is a light source, simultaneously with the generation of the recording magnetic field. The laser light is focused through the hologram lens 25 onto the metallic optical dispersion 22. Irradiation of the metallic optical dispersion 22 with the coherent laser light 24 leads to the uniform oscillation of free electrons within the optical dispersion 22 by the action of an electric field of the laser light 24, resulting in the excitation of plasmon and thereby in the generation of strong near-field light at the distal end of the metallic optical dispersion 22. In this manner, the magnetic recording layer 26, during recording, is simultaneously heated by the near-field light and is applied the magnetic field by the write head 19. Thereby, a desired recording magnetization transition is formed in the magnetic recording layer 26, according to information to be recorded. Thin film deposition process and lithography process can be used to fabricate a read-write head of the above-described configuration.

To reproduce information recorded on the magnetic recording layer 26, the read head equipped with a magnetic flux sensing device such as a GMR (giant magnetoresistive effect) element or a TMR (tunnel magnetoresistive effect) element is used to detect a leakage flux from the magnetic recording layer, and thereby magnetically reproduce the information. Alternatively, the read head equipped with an optical magnetic flux sensing device utilizing the Kerr effect and Faraday effect of the recording medium may be used to optically reproduce the information.

Description will be hereinafter given with regard to advantageous effects of the present invention, giving the results of calculations and discussions based on a computer simulation device using micromagnetics.

Firstly, description will be given with regard to a calculation method. The Langevin equation, which is obtained by adding a thermal-field h(t) to the Landau-Lifshitz-Gilbert equation given below, was used for calculation of recording magnetization. See J. Appl. Phys. 75(2), 15 Jan. 1994.

$$\frac{dM}{dt} = -\gamma[M \times \{H_{\text{eff}} + h(t)\}] + \frac{\alpha}{M}\left(M \times \frac{dM}{dt}\right) \quad (3)$$

$$<h_i(t)h_j(t+\tau)> = \frac{2kT\alpha}{\gamma V M_s}\delta(\tau)\delta_{ij}, \quad (4)$$

and $$<h_i(t)> = 0 \quad (5)$$

M denotes the magnetization of the grains; t, time; $H_{\text{eff}}$, an effective field; γ, a gyromagnetic constant; α, a Gilbert damping constant (or an extinction constant); $M_s$, saturation magnetization; h(t), an effective thermal-field; k, a Boltzmann constant; T, a temperature; V, the volume of the grains; δ(τ), a Dirac delta function; and ρ, a step of time. $\delta_{ij}$ denotes a Kronecker delta, and i and j denote components (x, y, z) of the magnetic field. < > represent a time average.

The magnitude of h(t) applied to each grain was assumed from Equations (4) and (5), provided that the average is zero, that h(t) follows Gaussian distribution using as dispersion a coefficient of the right side of Equation (4), ($2kT\alpha/\gamma V M_s$), and that the direction of h(t) is a random vector. From Equation (4), the magnitude of the effective thermal-field applied to the grains was assumed to vary in steps of time, provided that δ(τ) is the reciprocal of the step of time.

Figure 6:
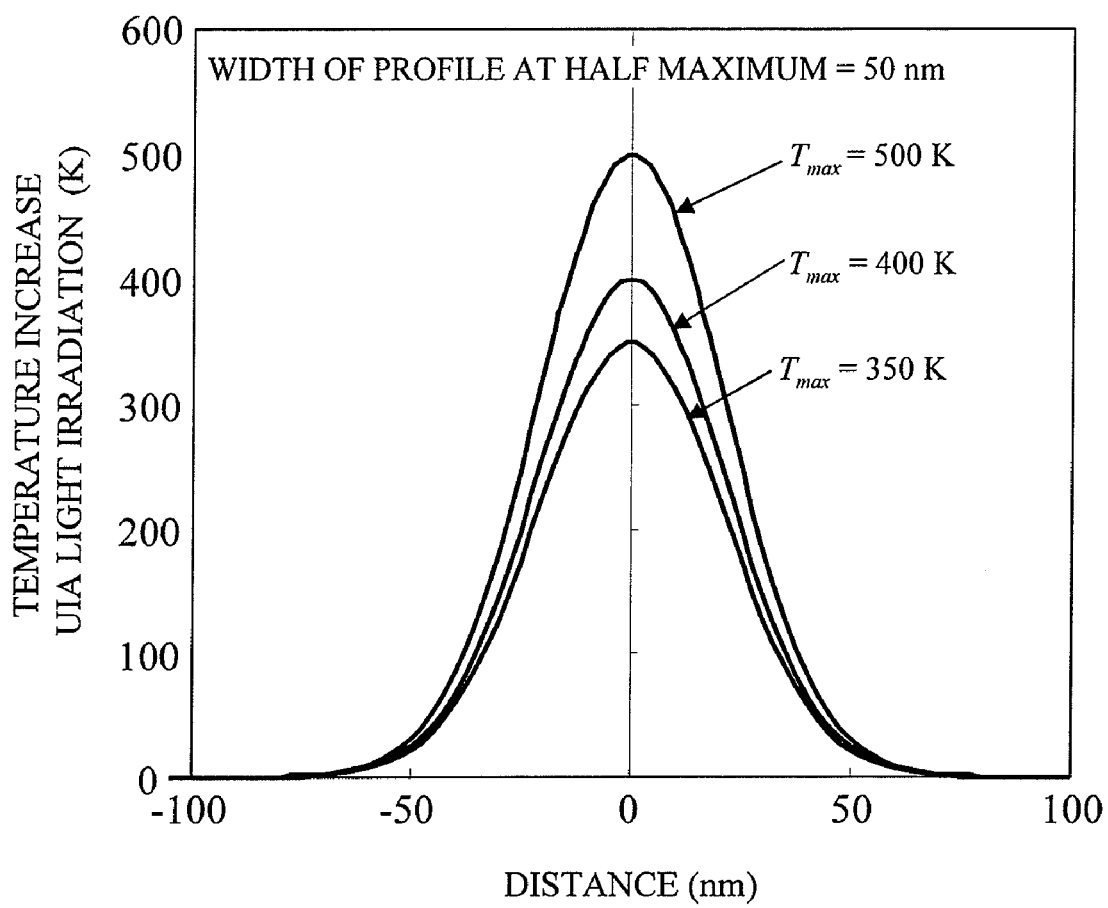
FIG. 6 is a graph showing an example of a temperature increase profile via light irradiation.
Figure 7:
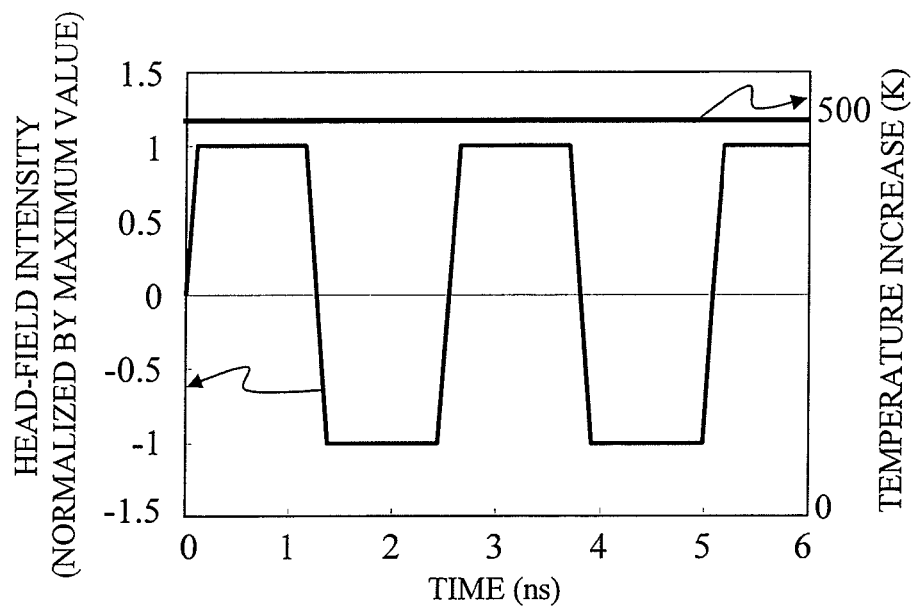
FIG. 7 is a graph showing an example of the changes of head-field intensity and the value of temperature increase with respect to time.

The effect that the magnetic anisotropy energy $K_u$, and saturation magnetization $M_s$ of the medium decrease with increasing temperature was adopted for calculation of recording. FIG. 6 is a graph showing an example of a temperature increase profile of thermal distribution by light irradiation, which appears on a straight line passing through the center of the thermal distribution. The thermal distribution was assumed as Gaussian distribution. Given in FIG. 6 is an instance where the half value width of the thermal distribution is 50 nm and the maximum value $T_{max}$ of the temperature increase is 350 K, 400 K and 500 K. FIG. 7 is a graph showing the changes of the head-field intensity and the maximum value of the temperature increase with respect to time. The head-field intensity is given as normalized by the maximum value. The light irradiation was assumed as continuous irradiation, and the maximum value of the temperature increase was assumed to undergo no variation with time. The head-field intensity was assumed as uniform intensity applied to the medium, and to reverse depending on a recording pattern. Given in FIG. 7 is an instance where a linear recording density is 1000 kfci and magnetization rotates continuously.

Figure 8:
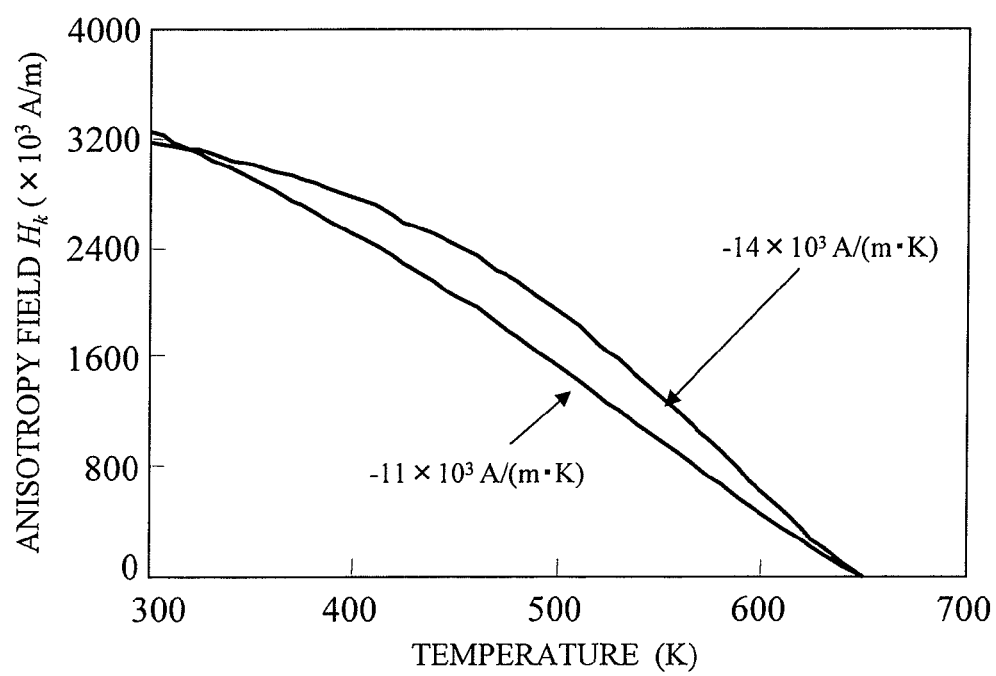
FIG. 8 is a graph showing an example of magnetic anisotropy field intensity on temperature properties.

FIG. 8 shows an example of the dependence of magnetic anisotropy field intensity $H_k$ ($H_k=2\times K_u/M_s$) on temperature. In FIG. 8, there is given the maximum gradient value $(dH_k/dT)_{max}$ of the dependence of magnetic anisotropy field intensity on temperature (in units of A/(m·K)). The value $(dH_k/dT)_{max}$ equal to $-11\times10^3$ A/(m·K) is illustrative of a CoCr-base medium. The value $(dH_k/dT)_{max}$ equal to $-14\times10^3$ A/(m·K) is illustrative of an FePt medium. As mentioned above, the maximum gradient value of the magnetic anisotropy field intensity varies according to the material for the medium. The maximum gradient value also varies according to material content. Curie temperature was set at 650 K. The magnetic properties of the medium used at room temperature are as follows. The average magnetic anisotropy field $<H_k>$ was set to $3200\times10^3$ A/m, and the dispersion was set to 0-15%. The dispersion of $H_k$ was defined as $\sigma H_k/<H_k>$ (expressed as a percentage), provided that $H_k$ has Gaussian distribution and its standard deviation is $\sigma H_k$. $M_s$ was set to 2.0 T or less (e.g., 0.5 T for use in calculations of FIGS. 13 to 15B to be described later). The average grain size <D> of the magnetic grains of the medium was set to 3 nm to 8 nm (e.g., 4.2 nm for use in the calculations of FIGS. 13 to 15B), and the grain dispersion was set to 0-25%. The grain dispersion was defined as $\sigma D/<D>$ (expressed as a percentage), provided that the grain size has lognormal-Gaussian distribution and its standard deviation is σD. A grain dispersion of 25% is about the same as that of a conventional perpendicular recording medium. A magnetic exchange constant was set to zero, provided that little magnetic exchange interaction takes place between the grains. A film thickness was set to 20 nm. The linear recording density was set to 1000 kfci. To evaluate recording characteristics alone, an output signal was determined by performing a Fourier transform on a magnetization profile obtained by integrating the magnetization of the medium in a track width direction, provided that spacing is zero.

Figure 4:
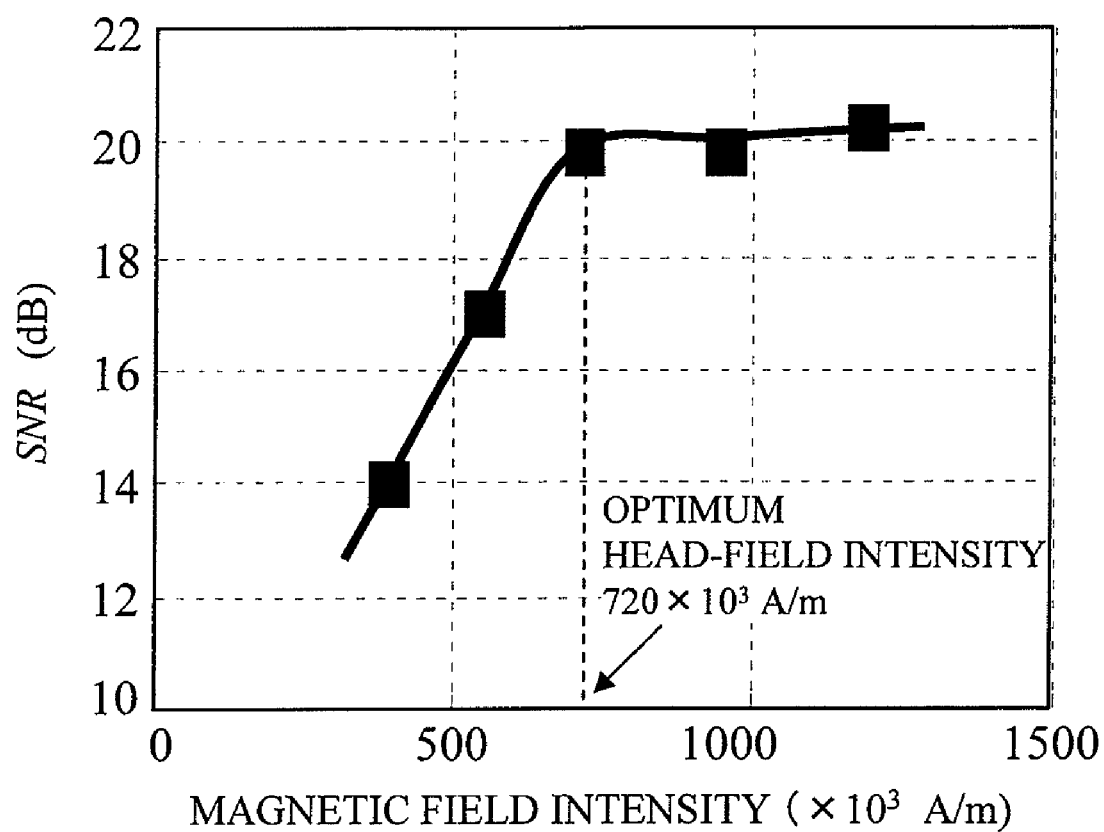
FIG. 4 is a plot showing an example of the dependence of SNR on magnetic field intensity.
Figure 5A:
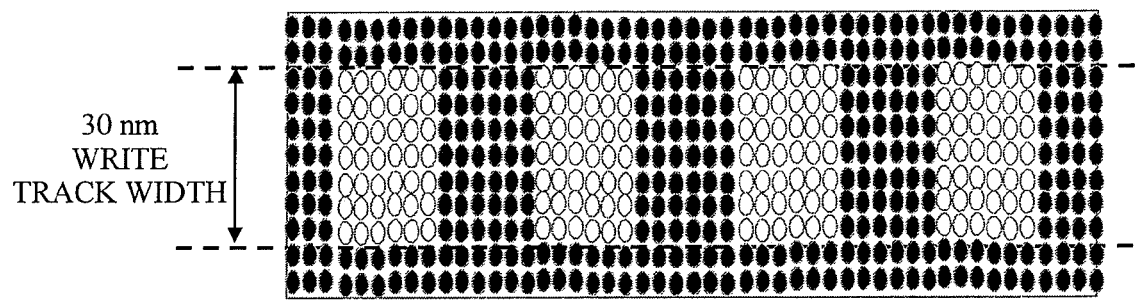
FIG. 5A is a schematic illustration showing magnetization rotating patterns of medium grains.
Figure 5B:
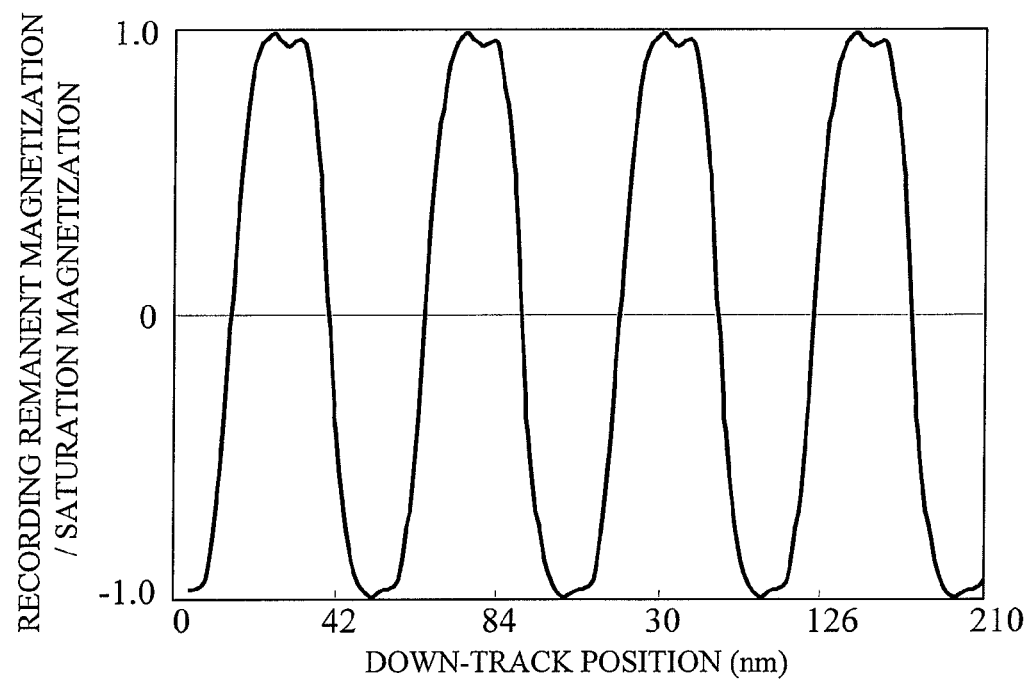
FIG. 5B is a graph showing an example of a profile of recording remanent magnetization in down-track direction.

The results of calculations will be given. FIG. 4 shows the dependence of SNR (signal-to-noise ratio) on magnetic field intensity in a situation where the recording track width is 50 nm and the maximum value of the temperature increase is 350 K, as mentioned above. The magnetic field intensity is given as measured both at the center of the magnetic recording layer in the direction of the thickness thereof and at the recording track edges. Since head-field distribution is uniform distribution, the magnetic field intensity at the center of the recording layer is the same as that at the recording track edges. Thus, optimum head-field intensity is $720\times10^3$ A/m. This result is against expectations, as mentioned above. Specifically, since the maximum value of the temperature increase, during recording, is the Curie temperature, magnetization rotates so as to perform the recording, when $H_k$ is reduced to the vicinity of zero, as can be seen from FIG. 8. If magnetization rotation follows Stoner-Wholfarth type coherent rotation model, the application of a magnetic field approximately equal to $H_k$ can possibly lead to the magnetization rotation. If defects are encountered in the grains, or if nucleation of magnetization rotation occurs in the grains and leads to non-coherent rotation and thus to the acceleration of magnetization rotation, an applied magnetic field equal to or less than $H_k$ can possibly be sufficient for saturation recording. When the temperature is raised to the vicinity of the Curie temperature, therefore, a magnetic field intensity of $80\times10^3$ A/m or less, which is approximately equal to that for use in an optical magnetic recording method, can possibly be sufficient for recording. It has been shown that although the optimum head-field intensity, during recording, is about ⅕ as compared to $H_k$ at room temperature, high magnetic field intensity is necessary as compared to that for the optical magnetic recording method. As for the reason for this, computer simulations have been performed as given below.

Figure 9:
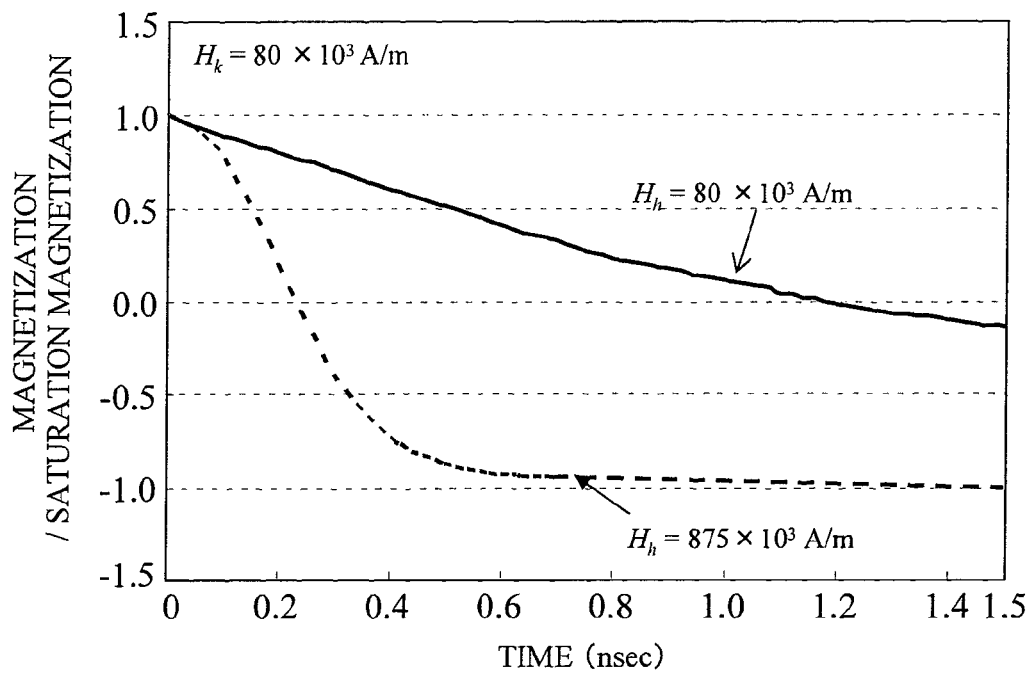
FIG. 9 is a graph showing the relation between component in medium thickness direction for vector of magnetization and time when one magnetic grain having $H_k$ of $80 \times 10^3$ A/m rotates.
Figure 10:
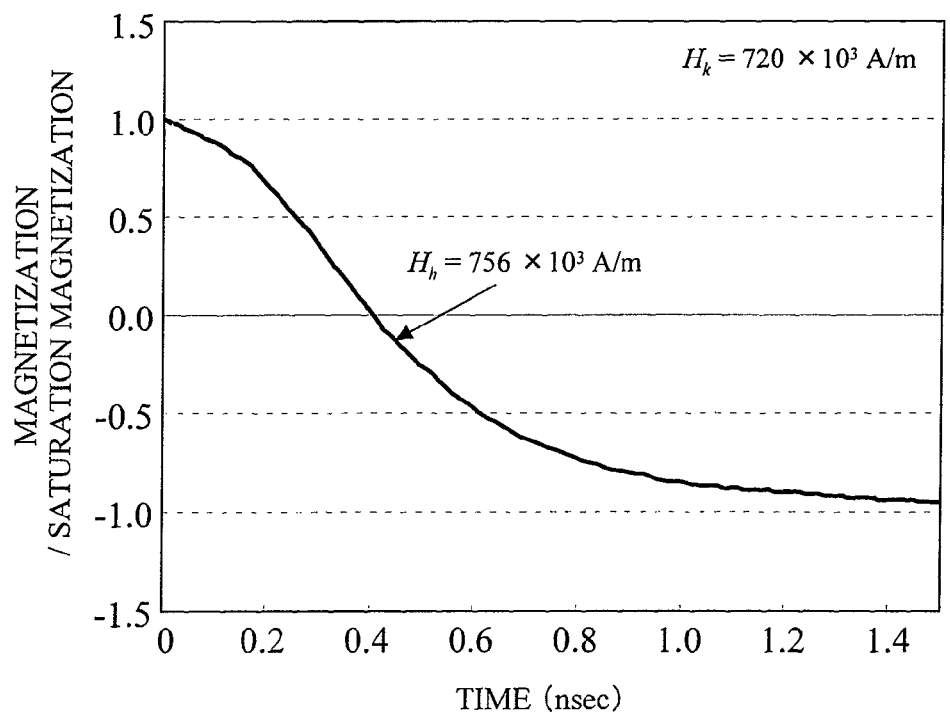
FIG. 10 is a graph showing the relation between component in medium thickness direction for vector of magnetization and time when one grain having $H_k$ of $720 \times 10^3$ A/m rotates.

FIG. 9 shows the result of calculation of the relation between magnetization and time, which exists when a uniform magnetic field $H_h$ is applied to one grain with $H_k$ equal to $80\times10^3$ A/m to thereby cause magnetization rotation from plus to minus. Temperature was set at 650 K, which is the same as the temperature set during recording. From the result of calculation of FIG. 9, it has been shown that when $H_h$ identical to $H_k$ ($80\times10^3$ A/m) is applied, magnetization rotation by half takes about 1.2 nsec, and subsequent magnetization rotation takes more time under the influence of heat. Magnetization rotation requires about 10 nsec (not shown). This is equivalent to a relative velocity of about 2.5 m/sec between the head and the medium. Higher $H_h$ leads to shorter time for magnetization rotation by half and hence to less influence of heat on subsequent magnetization rotation, resulting in shorter time required for magnetization rotation. Calculation of FIG. 4 is done, provided that the relative velocity is 16 m/sec, and that the recording density is 1000 kfci. The result of calculation shows that the writing of one record bit takes about 1.5 nsec. Accordingly, calculation was done to determine a magnetic field required for magnetization rotation within 1.5 nsec. The result of calculation has shown that the required magnetic field is about $875\times10^3$ A/m as shown in FIG. 9. In other words, high magnetic field intensity can be possibly necessary for magnetic recording at normal velocity, although even a low magnetic field enables saturation recording if it is static recording involving little relative motion between the head and the medium. Next, calculation was done in the same manner shown in FIG. 9 to determine a change in magnetization with respect to time, which occurs when a uniform magnetic field is applied to one grain having $H_k$ equal to $720\times10^3$ A/m. Calculation was done to determine a magnetic field required to write one record bit, provided that the relative velocity is 16 m/sec and the recording density is 1000 kfci. The result of calculation has shown that the required magnetic field is $756\times10^3$ A/m as shown in FIG. 10.

Figure 11:
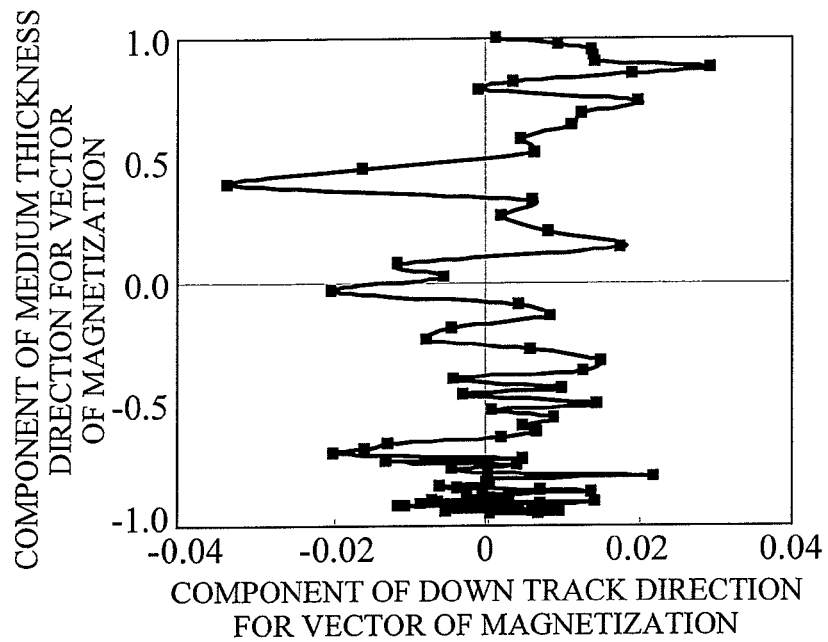
FIG. 11A is a plot showing component in medium thickness and down-track direction for vector of magnetization when one grain rotates in the case where $H_k=720 \times 10^3$ A/m and $Hh=720 \times 10^3$ A/m.
FIG. 11B is a plot showing component in medium thickness and down-track direction for vector of magnetization when one grain rotates in the case where $H_k=80 \times 10^3$ A/m and $Hh=80 \times 10^3$ A/m.
Figure 11:
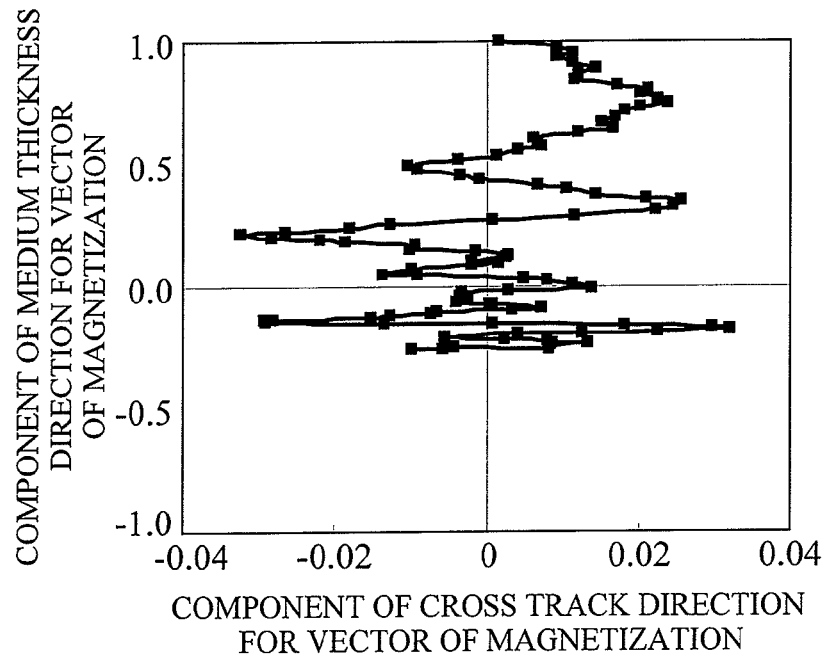

FIGS. 11A and 11B are plots of components of down-track direction for vector of magnetization along the horizontal axis and components of medium thickness direction for vector of magnetization along the vertical axis, illustrating how magnetization rotates when a magnetic field equal to $H_k$, where $H_k$ is $720\times10^3$ A/m (see FIG. 11A) and $80\times10^3$ A/m (see FIG. 11B). In FIGS. 11A and 11B, an interval between rectangular marks is 20 ps, and the components are plotted until a lapse of 1.6 ns for which the grain with $H_k$ of $720\times10^3$ A/m substantially finishes magnetization rotation. From FIGS. 11A and 11B, it has been shown that even if the grain with $H_k$ of $720\times10^3$ A/m substantially completes magnetization rotation, the grain with $H_k$ of $80\times10^3$ A/m is still in process of undergoing magnetization rotation. This can be possible because magnetization rotation does not progress easily due to too low magnetic anisotropy energy and hence too weak a force for magnetization rotation. The above result is the reason for which the calculation of FIG. 4 cannot reduce the optimum head-field intensity.

Figure 12:
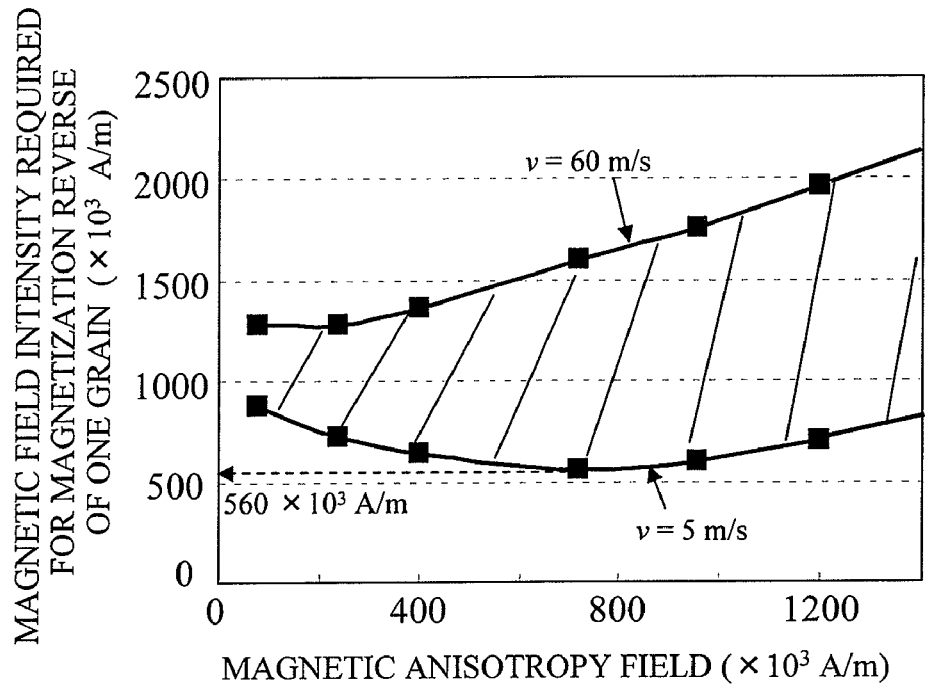
FIG. 12 is a plot showing the relation between magnetic field intensity required for magnetization rotation of one grain and magnetic anisotropy field.

FIG. 12 shows the results of calculations of a magnetic field required for magnetization rotation of one grain under a condition where $H_k$ takes on varying values. The time required for magnetization rotation was calculated from a relative velocity of about 5 to 60 m/sec of a currently-used magnetic disc system and a recording density of 1000 kfci. From FIG. 12, it has been shown that the magnetic field required for magnetization rotation is at least $560\times10^3$ A/m.

From FIG. 12, it has been shown that the minimum magnetic field required for magnetization rotation of one grain is $560\times10^3$ A/m. Next, recording was actually performed, and the conditions of head-field intensity for saturation recording were examined.

Figure 13:
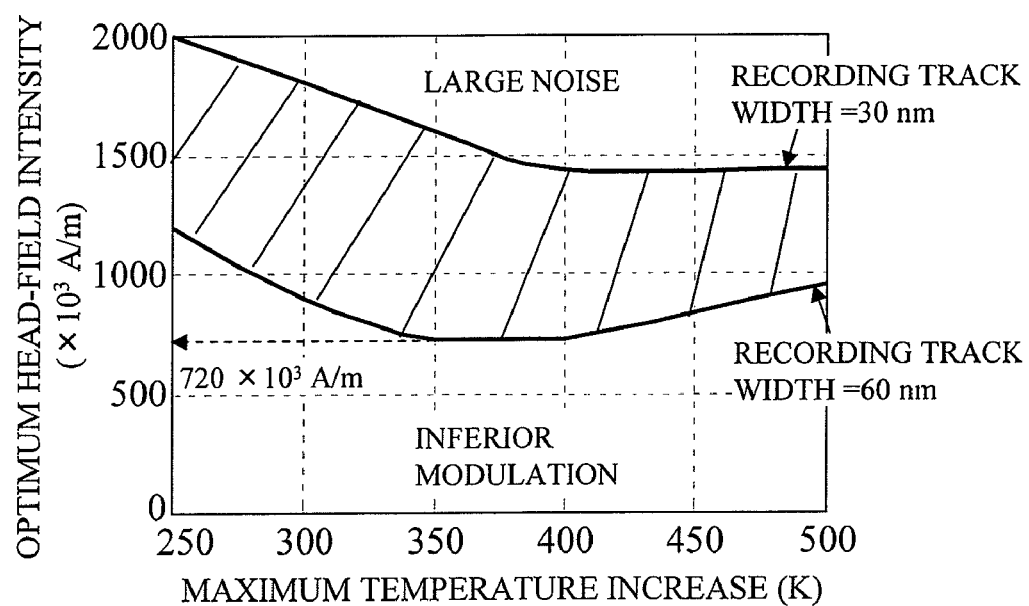
FIG. 13 is a graph showing the dependence of the optimum head-field intensity on the maximum value of temperature increase according to the present invention.
Figure 14:
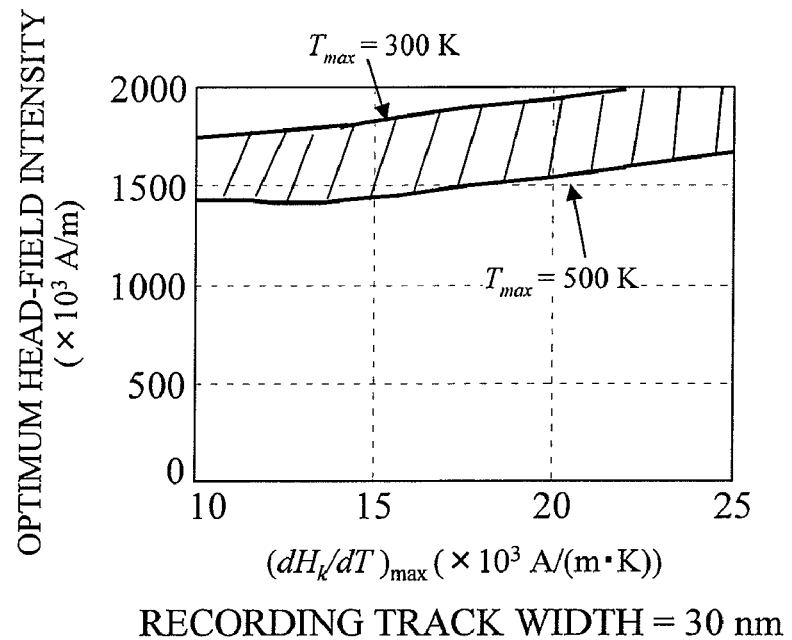
FIGS. 14A and 14B are graphs showing the dependence of the optimum head-field intensity on $dH_k/dT$ according to the present invention, in the case where recording track width are 30 nm and 60 nm, respectively.
Figure 14:
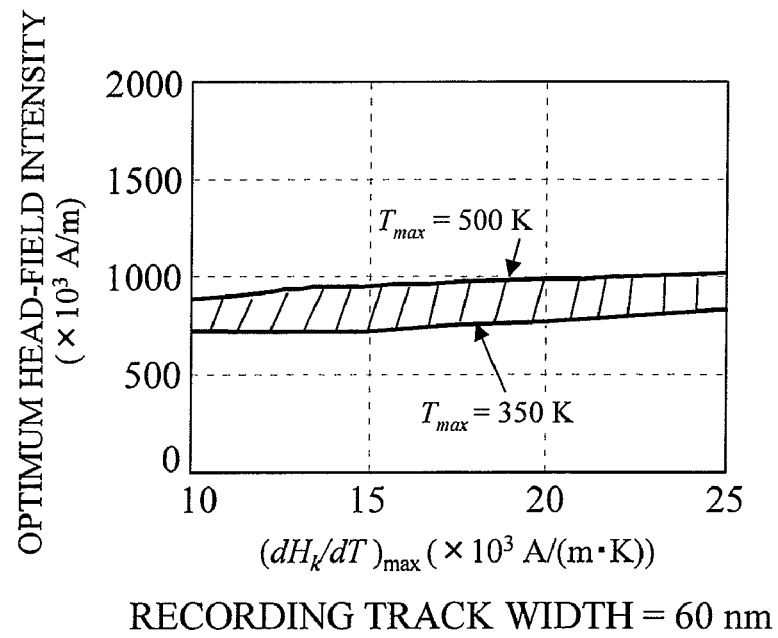

FIG. 13 is a graph showing the dependence of optimum head-field intensity on the maximum value of temperature increase. The maximum value of temperature increase was set at 250 to 500 K (at which a recording temperature is a Curie temperature of −100 to +150 K). The highest value of the maximum values of temperature increase is determined by a threshold limit value such that the medium does not change in content or properties under the influence of heat. The grain dispersion and the magnetic anisotropy energy dispersion were set to zero. The maximum gradient of temperature properties of the magnetic anisotropy field was set to $-14\times10^3$ A/(m·K). Assuming that thermally assisted magnetic recording is applicable for a recording density of 400 Gbpsi or more, calculation was done for a recording track width of 60 nm or less. Detailed description will be given later with regard to an instance where the track width is equal to or more than 60 nm. Calculation was done for a relative velocity of 60 m/sec (incidentally, the same result was obtained in the case of the relative velocity lying between 20 and 60 m/sec).

In FIG. 13, a lower curve shows an instance where the recording track width is equal to 60 nm, and an upper curve shows an instance where the recording track width is equal to 30 nm. The optimum head-field intensity lies between these two curves when the track width lies between 30 and 60 nm. From FIG. 13, it has been shown that an optimum head-field intensity of at least $720\times10^3$ A/m or more (i.e., a recording track width of 60 nm and $T_{max}=350$ K) is necessary. In other words, under this condition, the optimum head-field intensity greater than the magnetic field intensity required for magnetization rotation of one grain is necessary. It has been also shown that a maximum of $2000\times10^3$ A/m (i.e., a recording track width of 30 nm and $T_{max}=250$ K) is sufficient. From this result and the threshold limit value of the head-field intensity ($2000\times10^3$ A/m), it has been also shown that the lowest value of the maximum values of temperature increase of thermal is 250 K. In FIG. 13, the magnetic field below the lower curve causes inferior magnetization modulation, and the magnetic field above the upper curve causes large noise.

FIGS. 14A and 14B show the results of examinations of the optimum head-field intensity under a condition where the magnetic anisotropy field intensity has varying temperature properties. The maximum gradient $(dH_k/dT)_{max}$ of the temperature properties of the magnetic anisotropy field intensity was set to $-10\times10^3$ A/(m·K) to $-25\times10^3$ A/(m·K). In FIGS. 14A and 14B, the gradient is given as an absolute value. FIGS. 14A and 14B show an instance where the track width is equal to 30 nm (see FIG. 14A) and an instance where the track width is equal to 60 nm (see FIG. 14B), respectively. Calculation was done under a condition where the maximum value $T_{max}$ of the temperature increase changes from 250 K to 500 K. However, when $T_{max}$ lies between 250 and 300 K, $H_k$ does not sufficiently decrease with an increase in $(dH_k/dT)_{max}$, and thus, saturation recording does not occur. For this reason, the results obtained for $T_{max}$ lying between 250 and 350 K are excluded from FIGS. 14A and 14B. At this point, the grain dispersion and the magnetic anisotropy energy dispersion were set to zero. When the recording track width is equal to 30 nm (see FIG. 14A), the optimum head-field intensity increases with increasing $(dH_k/dT)_{max}$. However, the optimum head-field intensity has about the same value when $(dH_k/dT)_{max}$ is equal to or less than $-10 \times 10^3$ to $-15 \times 10^3$ A/(m·K). The minimum value of the optimum head-field intensity was $1430 \times 10^3$ A/m, and the maximum value thereof was $2000 \times 10^3$ A/m. When the track width is equal to 60 m (see FIG. 14B), the optimum head-field intensity undergoes a slight change with respect to the increase in $(dH_k/dT)_{max}$. The minimum value of the optimum head-field intensity was $720 \times 10^3$ A/m, and the maximum value thereof was $1000 \times 10^3$ A/m. In FIGS. 14A and 14B, a curve that represents the lower limit of the optimum head-field intensity corresponds to a temperature of 350 K, and a curve that represents the upper limit thereof corresponds to a temperature of 500 K. The reason for this is as follows. As can be seen from FIG. 13, when the recording track width is equal to 60 nm, the minimum value of the optimum head-field intensity corresponds to a temperature of 350 K, and the maximum value thereof corresponds to a temperature of 500 K. In the case of each recording track width, therefore, a diagonally shaded area in each of FIGS. 14A and 14B corresponds to the optimum head-field intensity. From FIG. 13 and FIGS. 14A and 14B, it has been further shown that in the case of all recording track widths, the optimum head-field intensity lies between $720 \times 10^3$ and $2000 \times 10^3$ A/m.

Figure 15:
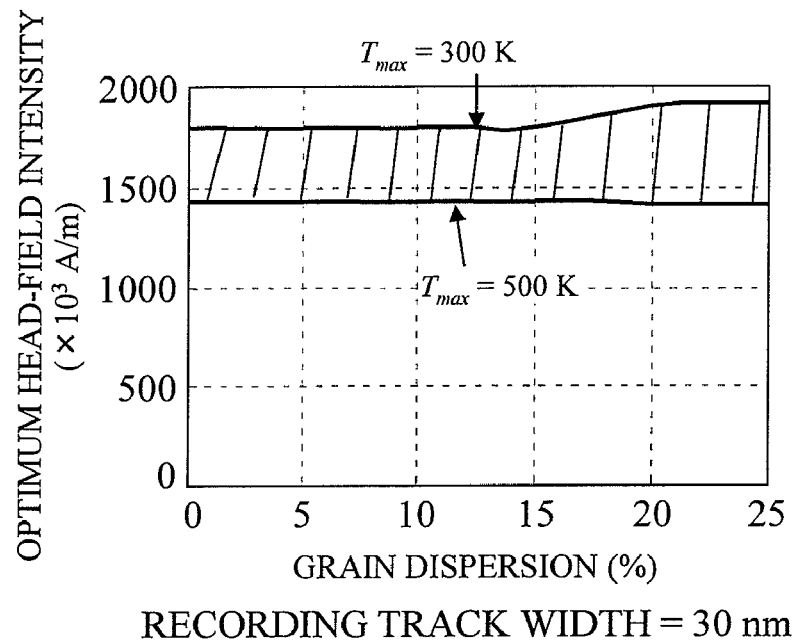
FIGS. 15A and 15B are graphs showing the dependence of the optimum head-field intensity on grain dispersion according to the present invention, in the case where recording track width are 30 nm and 60 nm, respectively.
Figure 15:
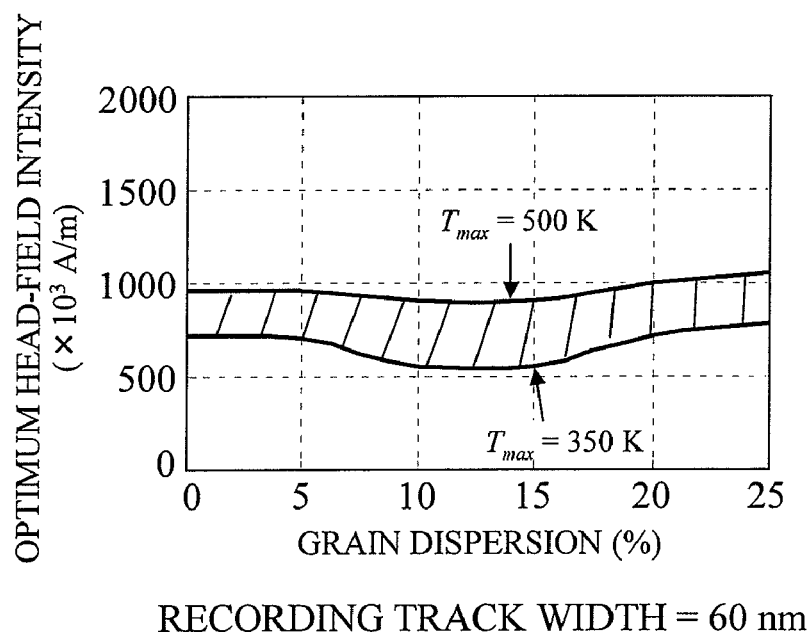

FIGS. 15A and 15B show the dependence of the optimum head-field intensity on the grain dispersion. FIGS. 15A and 15B are plots in an instance where the recording track width is equal to 30 nm (see FIG. 15A) and an instance where the recording track width is equal to 60 nm (see FIG. 15B), respectively. At this point, $(dH_k/dT)_{max}$ was set to $-14 \times 100$ A/(m·K). In the case of a recording track width of 30 nm, the minimum value of the optimum head-field intensity was $1400 \times 10^3$ A/m, and the maximum value thereof was $1900 \times 10^3$ A/m. In the case of a recording track width of 60 nm, the minimum value of the optimum head-field intensity was $560 \times 10^3$ A/m, and the maximum value thereof was $1050 \times 10^3$ A/m. In the case of each recording track width, a diagonally shaded area in each of FIGS. 15A and 15B corresponds to the optimum head-field intensity. From FIGS. 13 to 15B, it has been further shown that in the case of all recording track widths, the optimum head-field intensity lies between $560 \times 10^3$ and $2000 \times 10^3$ A/m.

Figure 1:
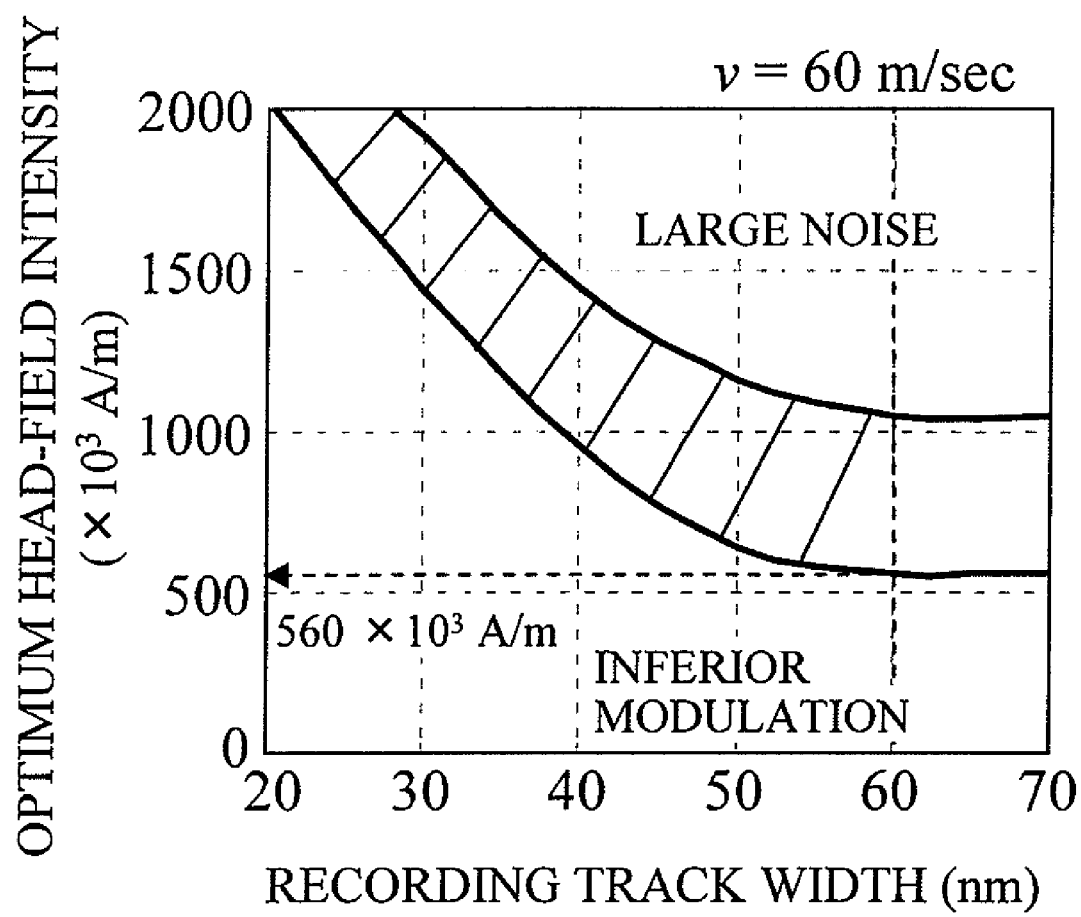
FIG. 1 is a graph showing the dependence of optimum head-field intensity on recording track width (velocity=60 m/sec) according to the present invention.

Furthermore, the results of examinations under a condition where the magnetic anisotropy energy dispersion, the average grain size and the saturation magnetization change the values, in conjunction with the results of FIGS. 13 to 15B, are shown in FIG. 1. FIG. 1 is a graph showing the dependence of the optimum head-field intensity on the recording track width. In FIG. 1, an upper curve shows the maximum value of the optimum head-field intensity, and a lower curve shows the minimum value of the optimum head-field intensity. The magnetic field below the lower curve causes inferior magnetization modulation, and the magnetic field above the upper curve causes large noise. Accordingly, the optimum head-field intensity has values lying between the curves. From FIG. 1, it has been shown that the optimum head-field intensity doesn't change when the track width is equal to or more than 60 nm, while the optimum head-field intensity increases sharply when the track width is equal to or less than 60 nm. The reason for this is as follows. The spot size of light must be reduced for writing in a narrow track width. When the spot size of light is reduced, energy for magnetization rotation of the grains (i.e., the integral of effective field intensity applied to the grains and the time for applying the magnetic field) is reduced as compared to the energy that is obtained when the spot size of light is large. For this reason, when the track width decrease, the magnetic field intensity must increase in order to ensure switching energy for magnetization rotation of the grains of the medium. As can be seen from FIG. 1, it can possibly be particularly important to make clear the optimum head-field intensity when the track width is equal to or less than 60 nm, since it is necessary to increase the linear recording density and also reduce the track width in order to achieve a high recording density. When the track width is equal to or less than 60 nm, the optimum head-field intensity falls within the range of a diagonally shaded area in FIG. 1. It has been shown that the optimum head-field intensity has to be equal to or more than at least $560 \times 10^3$ A/m. This result agrees with the minimum value of the magnetic field intensity required for magnetization rotation of one grain shown in FIG. 12.

Figure 16:
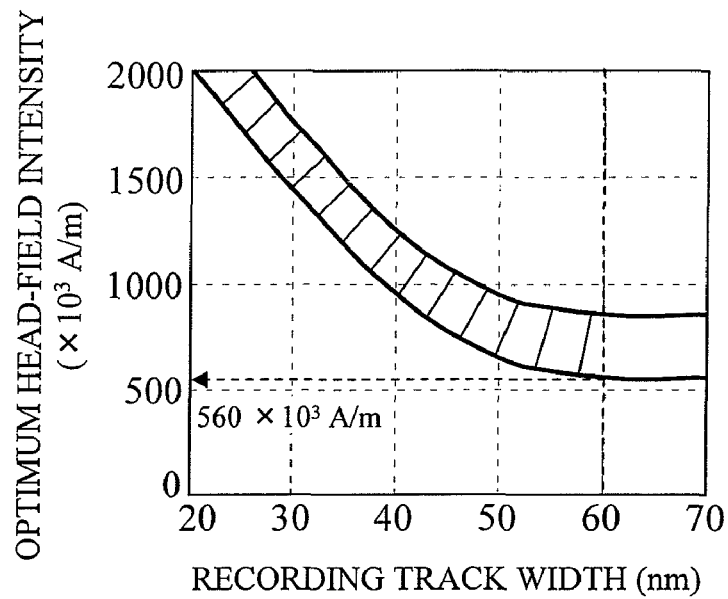
FIGS. 16A and 16B are graphs showing the dependence of the optimum head-field intensity on the recording track width according to the present invention, in the case where v=5 m/sec and v=10 m/sec, respectively.
Figure 16:
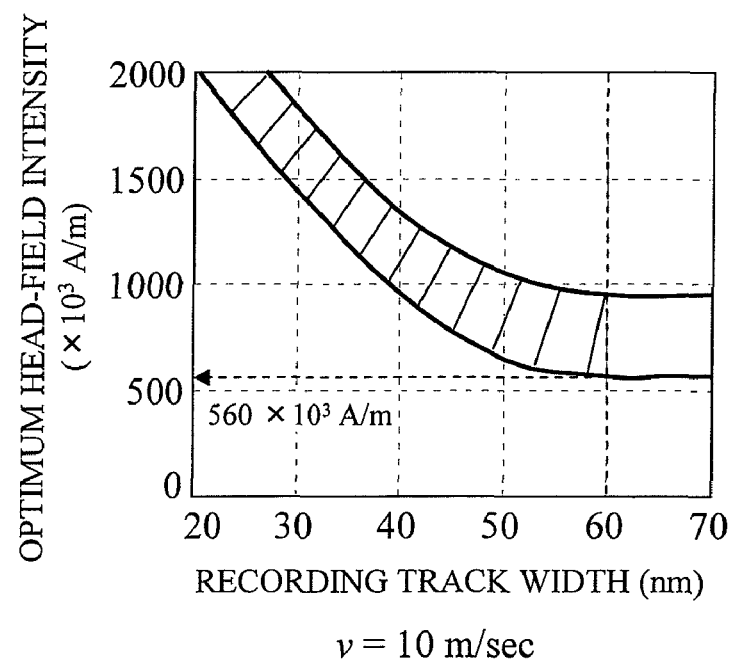

FIGS. 16A and 16B show the results of the same calculations as those shown in FIG. 1 in situations where the velocity is 5 m/sec and 10 m/sec. From FIGS. 16A and 16B, it has been shown that the optimum head-field intensity is constant when the track width is equal to or more than 60 nm, while the optimum head-field intensity has to be equal to or more than $560 \times 10^3$ A/m when the track width is equal to or less than 60 nm. It has been also shown that if the track width is constant, the minimum value of the optimum head-field intensity does not change even when the relative velocity is changed, while the maximum value thereof decreases when the relative velocity is reduced. The maximum value of the optimum head-field intensity becomes smaller as the velocity becomes lower. The reason for this can be possible that the energy increases as the velocity decreases since the energy for magnetization rotation of the grains is proportional to the time for applying the magnetic field. The reason for which the minimum value of the optimum head-field intensity is not affected by the velocity can be possible that there is a limit to the maximum value of energy determined by the recording track widths (or the spot sizes of heat).

Figure 17:
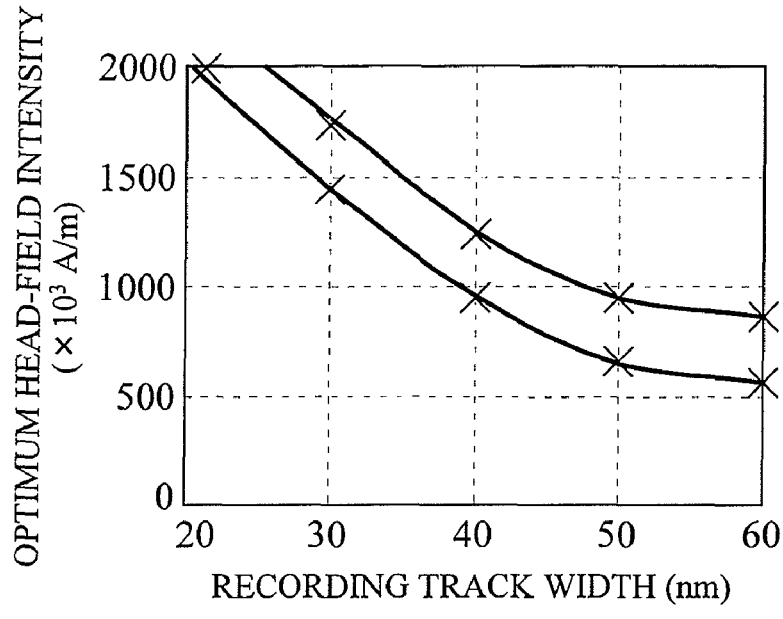
FIGS. 17A and 17B are graphs showing polynomial approximation of the dependence of the optimum head-field intensity on the recording track width according to the present invention, in the case where v=5 m/sec and v=60 m/sec, respectively.
Figure 17:
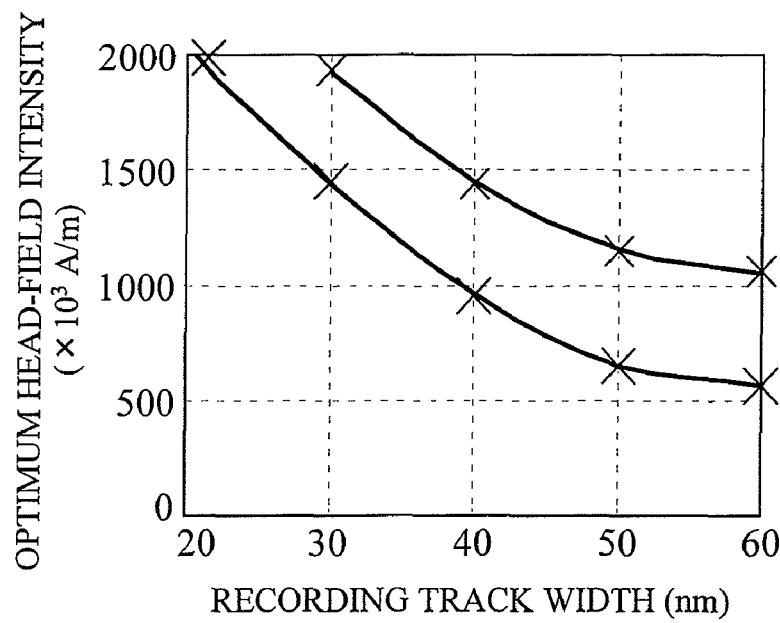

FIGS. 17A and 17B are graphs showing the results of polynomial approximations made on the results of FIG. 1 and FIGS. 16A and 16B. When the recording track width is equal to or less than 60 nm, the minimum value of the optimum head-field intensity is given by the following equation:

$$Y=(X^2-119 \times X+4135) \times 1000 \quad (6)$$

where X denotes the nondimensional value of the recording track width divided by $10^{-9}$ m, and Y denotes the magnetic field intensity applied to the medium (in units of A/m).

In FIGS. 17A and 17B, curves show the minimum value of the optimum head-field intensity calculated by LLG, and Xs represent the results of calculations by the above polynomial approximations. In the case of the polynomial approximations, the minimum value of the optimum head-field intensity is $560 \times 10^3$ A/m. Consequently, the condition of the optimum head-field intensity for saturation recording is given by the following inequality.

$$Y \geq (X^2-119 \times X+4135) \times 1000 \quad (7)$$

The maximum value of the optimum head-field intensity is given by the following equation.

$$Y=(X^2-119 \times X+\text{const}) \times 1000 \quad (8)$$

Figure 18:
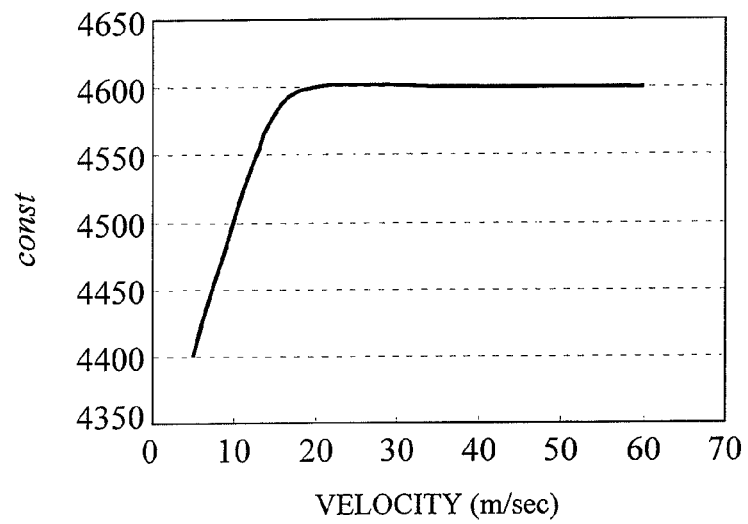
FIG. 18 is a graph showing the relation between const shown in polynomial approximation of the dependence of the optimum head-field intensity on the recording track width and velocity according to the present invention.

In the above equation, const denotes the value that depends on the relative velocity. FIG. 18 shows the relation between const and the relative velocity. As shown in FIG. 18, const is 4400 when the relative velocity is 5 m/sec, and const is 4600 when the relative velocity is 60 m/sec. Consequently, const is the value lying between 4400 and 4600 inclusive, when the relative velocity lies between 5 and 60 m/sec inclusive. Therefore, the condition of the optimum head-field intensity for saturation recording is given by the following inequality:

$$Y \leq (X^2 - 119 \times X + \text{const}) \times 1000 \quad (9)$$

where const can be expressed as the following equations, based on FIG. 18.

$$\text{const} = -0.8 \times v^2 + 33.7 \times v + 4250 \text{ (if the relative velocity v is less than 20 m/sec)}$$

$$\text{const} = 4600 \text{ (if the relative velocity v is equal to or more than 20 m/sec)}$$

Therefore, the range that satisfies both Inequalities (7) and (9) is the most preferable range for saturation recording.

Figure 19:
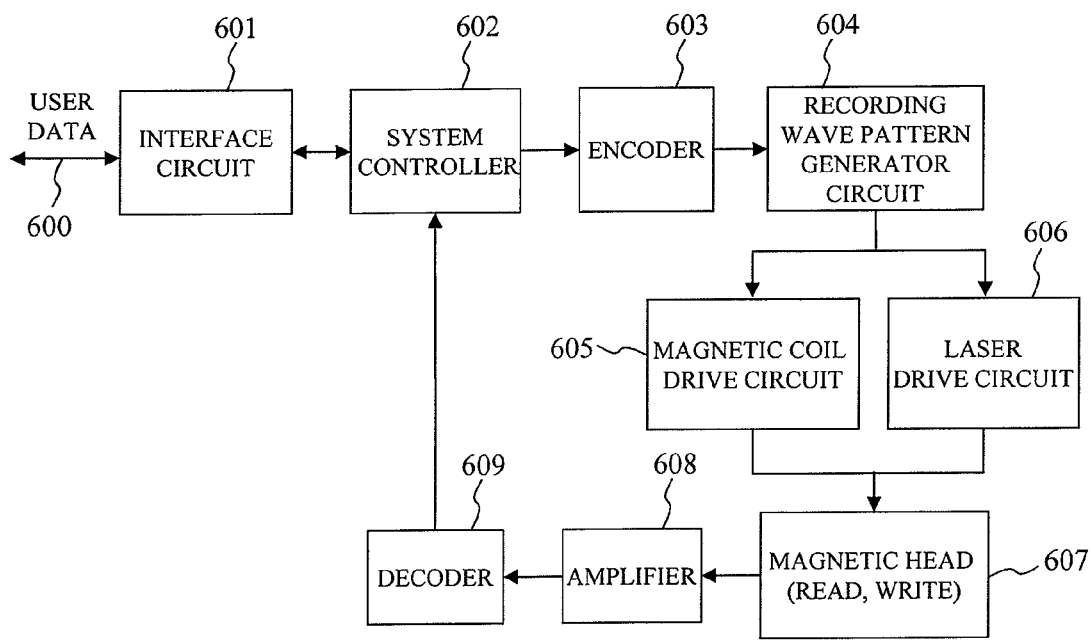
FIG. 19 is a schematic illustration showing a signal processing circuit according to the present invention.

FIG. 19 is a schematic block diagram of a signal processing circuit. The recording of information is performed in the following manner. User data 600 to be recorded is fed to a system controller 602 through an interface circuit 601 to external equipment. The user data 600 is subjected to error detection and is given error correction information or the like to be appended thereto, as needed. Then, the user data 600 is transmitted to an encoder 603. For example, the encoder 603 performs (1, 7) modulation on the user data 600 and then performs NRZI (non-return-to-zero-inverted) conversion on the user data 600 to thereby generate a signal that reflects the alignment of recording magnetization on a recording medium (not shown). By referring to the signal, a recording wave pattern generator circuit 604 generates a control signal for a recording bias magnetic field and a control signal for laser light intensity. Upon receipt of a command from the system controller 602, a magnetic coil drive circuit 605 drives a recording coil (not shown) of a magnetic head 607 to thereby generate the recording bias magnetic field in an area where strong near-field light is generated by a metallic optical dispersion (not shown), in accordance with the control signal for the recording bias magnetic field. Upon receipt of a command from the system controller 602, a laser drive circuit 606 also drives a semiconductor laser (not shown) that is a recording energy source, in accordance with the control signal for the laser light intensity.

The reproduction of information is performed in the following manner. A GMR element (not shown) of the magnetic head 607 scans the surface of a recording layer (not shown) to thereby detect a signal that reflects the alignment of recording magnetization. An output signal from the GMR element, which reflects the alignment of recording magnetization, is amplified to required level by an amplifier 608, and is then inputted to a decoder 609. The decoder 609 decodes recorded data by performing conversion inversely with the encoder 603, and then transmits the decoded data to the system controller 602. The system controller 602 subjects the data to processing such as error detection or error correction as needed, and then sends out the reproduced user data 600 to the external equipment via the interface circuit 601.

What is claimed is:

1. A thermally assisted magnetic recording system, comprising:
   an information recording medium including a substrate and a perpendicular recording layer formed on top of the substrate, the perpendicular recording layer having a structure in which magnetic grains are precipitated in a non-magnetic matrix;
   a thermally assisted magnetic write head including a magnetic pole that applies a recording magnetic field to the information recording medium, and an element that heats a predetermined region of the information recording medium; and
   a read head including a read sensor,
   wherein the magnetic field applied to the information recording medium is equal to or more than 560 kA/m at the center of the perpendicular recording layer in the direction of the thickness thereof.

2. The thermally assisted magnetic recording system according to claim 1, wherein the magnetic field applied to the information recording medium is a uniform magnetic field in the vicinity of a recording region of the information recording medium.

3. The thermally assisted magnetic recording system according to claim 1, wherein under a condition where the recording track width of the information recording medium is equal to or less than 60 nm, the following inequality is satisfied:

$$Y \geq (X^2 - 119 \times X + 4135) \times 1000$$

where X denotes the nondimensional value of the recording track width divided by $10^{-9}$ m, and Y denotes the magnetic field (expressed in units of A/m) applied by the magnetic pole to the center of the information recording medium in the direction of the thickness thereof.

4. The thermally assisted magnetic recording system according to claim 3, wherein the following equation is satisfied:

$$Y \leq X^2 - 119 \times X + \text{const}) \times 1000$$

provided that const$=-0.8 \times v^2 + 33.7 \times v + 4250$ if v is less than 20 m/sec, or const$=4600$ if v is equal to or more than 20 m/sec, where v denotes a relative velocity between the head and the medium at the position of the thermally assisted magnetic write head.

5. The thermally assisted magnetic recording system according to claim 4, wherein the relative velocity v between the head and the medium at the position of the thermally assisted magnetic write head is equal to or more than 5 m/sec.

6. The thermally assisted magnetic recording system according to claim 1, wherein the magnetic field applied to recording track edges of the information recording medium is equal to or more than 560 kA/m at the center of the perpendicular recording layer in the direction of the thickness thereof.

7. The thermally assisted magnetic recording system according to claim 1, wherein the perpendicular recording layer formed on top of the substrate is a granular perpendicular magnetic film having an axis of magnetization in a direction perpendicular to its film surface.

8. A thermally assisted magnetic recording system, comprising:
   a magnetic recording medium including a substrate and a magnetic recording layer formed on a surface of the substrate and provided with a structure in which magnetic grains are substantially magnetically isolated from one another with a non-magnetic material disposed in between;
   a thermally assisted magnetic write/read head for magnetically recording data on the magnetic recording medium and magnetically reproduce information from the magnetic recording medium, the thermally assisted magnetic write/read head comprising:
   a magnetic write head including a magnetic pole to apply a magnetic field intensity to the magnetic recording layer on the magnetic recording medium, and a thermal element to heat a recording region of the information recording medium; and
   a magnetic read head adjacent to the magnetic write head, including first and second magnetic shield layers and a read sensor disposed between the first and second magnetic shield layers, wherein the magnetic field intensity applied to the magnetic recording layer on the information recording medium is no less than 560 kA/m at both a center of the magnetic recording layer in the direction of a thickness thereof and to recording track edges on the magnetic layer.

9. The thermally assisted magnetic recording system according to claim 8, wherein the magnetic field intensity applied to the magnetic recording medium is a uniform magnetic field in the vicinity of the recording region of the magnetic recording medium.

10. The thermally assisted magnetic recording system according to claim 8, wherein, when a recording track width of the information recording medium is equal to or less than 60 nm, the following inequality is satisfied:

$$Y \geq (X^2 - 119 \times X + 4135) \times 1000$$

where X denotes a non-dimensional value of the recording track width divided by $10^{-9}$ m, and Y denotes the magnetic field (expressed in units of A/m) applied by the magnetic pole to the center of the information recording medium in the direction of the thickness thereof.

11. The thermally assisted magnetic recording system according to claim 10, wherein the following equation is satisfied:

$$Y \leq (X^2 - 119 \times X + \text{const}) \times 1000$$

provided that const=$0.8 \times v^2 + 33.7 \times v + 4250$ if v is less than 20 m/sec, or const=4600 if v is equal to or more than 20 m/sec, where v denotes a relative velocity between the thermally assisted magnetic write/read head and the magnetic recording medium at the position of the thermally assisted magnetic write head.

12. The thermally assisted magnetic recording system according to claim 11, wherein the relative velocity v between the thermally assisted magnetic write/read head and the magnetic recording medium at the position of the thermally assisted magnetic write head is equal to or more than 5 m/sec.

13. The thermally assisted magnetic recording system according to claim 8, wherein the magnetic recording layer formed on top of the substrate is a granular perpendicular magnetic film having an axis of magnetization in a direction perpendicular to its film surface.

* * * * *